US011265927B1

(12) United States Patent
Chu et al.

(10) Patent No.: US 11,265,927 B1
(45) Date of Patent: Mar. 1, 2022

(54) MEDIA ACCESS CONTROL FOR MULTI-BAND COMMUNICATION IN WLAN

(71) Applicant: NXP USA, Inc., Austin, TX (US)

(72) Inventors: Liwen Chu, San Ramon, CA (US); Hongyuan Zhang, Fremont, CA (US)

(73) Assignee: NXP USA, INC., Austin, TX (US)

( * ) Notice: Subject to any disclaimer, the term of this patent is extended or adjusted under 35 U.S.C. 154(b) by 238 days.

(21) Appl. No.: 16/396,336

(22) Filed: Apr. 26, 2019

Related U.S. Application Data

(60) Provisional application No. 62/663,189, filed on Apr. 26, 2018.

(51) Int. Cl.
H04W 72/04 (2009.01)
H04W 74/08 (2009.01)
H04W 76/27 (2018.01)
H04W 76/15 (2018.01)

(52) U.S. Cl.
CPC ..... H04W 74/085 (2013.01); H04W 72/0453 (2013.01); H04W 76/15 (2018.02); H04W 76/27 (2018.02)

(58) Field of Classification Search
None
See application file for complete search history.

(56) References Cited

U.S. PATENT DOCUMENTS 10,257,806 B2 4/2019 Chu et al.
10,349,413 B2 7/2019 Zhang et al.
10,805,051 B2* 10/2020 Zhang ..................... H04L 5/001
10,834,639 B2* 11/2020 Chu ....................... H04W 28/20
10,849,024 B2* 11/2020 Chu ....................... H04W 28/20
2003/0058816 A1* 3/2003 Shearer, III ........... H04W 72/04
370/329

(Continued)

FOREIGN PATENT DOCUMENTS

EP 2028809 A2 2/2009
EP 2999252 3/2016

(Continued)

OTHER PUBLICATIONS

Fischer et al., "IEEE P802.11—Wireless LANs—Disallowed Sub channels," doc. No. IEEE 802.11-18/0496r3, The Institute of Electrical and Electronics Engineers, pp. 1-11 (May 2018).

(Continued)

Primary Examiner — Willie J Daniel, Jr.

(57) ABSTRACT

A communication device performs a backoff procedure to determine when a first channel in a first radio frequency (RF) band is idle in connection with reserving an aggregate communication channel, which includes a first frequency portion in the first RF band and a second frequency portion in a second RF band, for a frame exchange. In response to determining that the first channel is idle, the communication device transmits a first packet that reserves at least the first channel for a first particular time duration. In connection with determining that the first channel is idle, the communication device performs one or more energy level measurements in a second channel in the second RF band to determine whether the second channel is idle. The communication device transmits a second packet that reserves at least the second channel for a second particular time duration in connection with reserving the aggregate communication channel.

18 Claims, 16 Drawing Sheets

(56) References Cited

U.S. PATENT DOCUMENTS

| | | | |
|---|---|---|---|
| 2011/0249659 | A1 | 10/2011 | Fontaine et al. |
| 2016/0212748 | A1 | 7/2016 | Yang et al. |
| 2017/0149547 | A1 | 5/2017 | Kim et al. |
| 2017/0181136 | A1 | 6/2017 | Bharadwaj et al. |
| 2017/0257888 | A1* | 9/2017 | Kneckt ............ H04W 74/0816 |
| 2017/0311204 | A1 | 10/2017 | Cariou et al. |
| 2017/0325178 | A1 | 11/2017 | Verma et al. |
| 2017/0338935 | A1* | 11/2017 | Ahn .................. H04W 72/0446 |
| 2017/0366329 | A1 | 12/2017 | Cao et al. |
| 2018/0115403 | A1 | 4/2018 | Sakai et al. |
| 2018/0302858 | A1 | 10/2018 | Son et al. |
| 2019/0123863 | A1 | 4/2019 | Zhang et al. |
| 2019/0182714 | A1 | 6/2019 | Chu et al. |
| 2019/0182863 | A1 | 6/2019 | Chu et al. |
| 2019/0349930 | A1 | 11/2019 | Chu et al. |

FOREIGN PATENT DOCUMENTS

| | | |
|---|---|---|
| GB | 2501898 A | 11/2013 |
| WO | WO-2006/000955 | 1/2006 |
| WO | WO-2012/026779 A2 | 3/2012 |
| WO | WO-2015/099803 | 7/2015 |
| WO | WO-2017/026937 | 2/2017 |
| WO | WO-2017/111567 A2 | 6/2017 |

OTHER PUBLICATIONS

IEEE P802.11ax™/D2.2, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 620 pages (Feb. 2018).

IEEE P802.11ax™/D4.0, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 1: Enhancements for High Efficiency WLAN," IEEE Computer Society, 746 pages (Feb. 2019).

IEEE Std 802.11-REVmc™/D8.0 (revision of IEEE Std. 802.11™-2012) "Draft Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, 3774 pages (Aug. 2016).

Orfanos et al., "A New Distributed Coordination Function for W-LANs with Multiple Channel Structure," Proceedings of the 14th 1st Mobile and Wireless Communications Summit; Dresden, Germany, 5 pages (Jun. 19, 2005).

U.S. Appl. No. 16/399,517, Zhang et al., "WiFi Multi-Band Communication," filed Apr. 30, 2019.

Zhang et al.; "EHT Technology Candidate Discussions"; IEEE document 802.11-18/1161rO; 10 pages (Jul. 2018).

\* cited by examiner

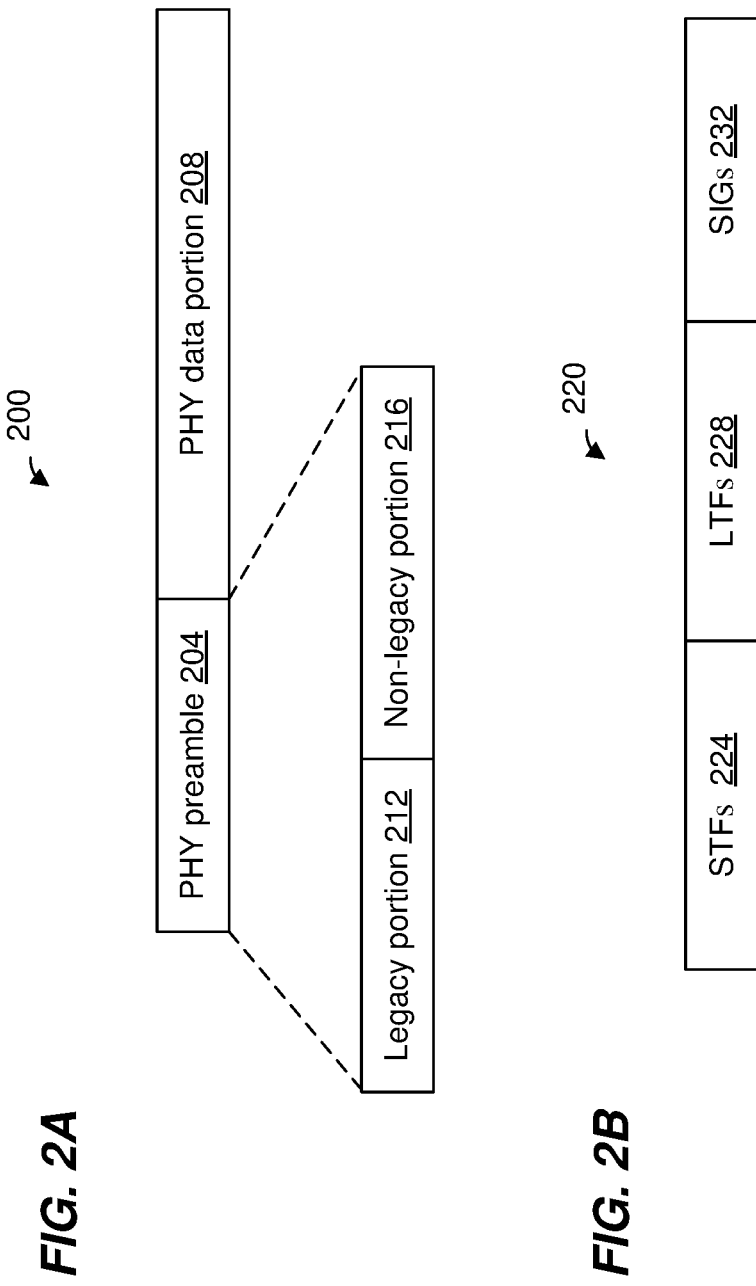

MEDIA ACCESS CONTROL FOR MULTI-BAND COMMUNICATION IN WLAN

CROSS REFERENCES TO RELATED APPLICATIONS

This application claims the benefit of U.S. Provisional Patent Application No. 62/663,189, entitled "Media Access Control (MAC) Support of Frequency Division Duplex (FDD) Channel Aggregation," filed on Apr. 26, 2018, which is hereby incorporated herein by reference in its entirety.

FIELD OF TECHNOLOGY

The present disclosure relates generally to wireless communication systems, and more particularly to media access control for transmission and reception over multiple communication channels.

BACKGROUND

Wireless local area networks (WLANs) have evolved rapidly over the past two decades, and development of WLAN standards such as the Institute for Electrical and Electronics Engineers (IEEE) 802.11 Standard family has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. The IEEE 802.11ax Standard now under development significantly improves throughput over the IEEE 802.11ac Standard.

SUMMARY

In an embodiment, a method for wireless local area network (WLAN) medium access control in a plurality of radio frequency (RF) bands includes: performing, at a communication device, a backoff procedure to determine when a first channel in a first RF band, among the plurality of RF bands, is idle in connection with reserving an aggregate communication channel for a frame exchange, wherein the backoff procedure includes decrementing a backoff counter only when at least a portion of the first channel is determined to be idle, wherein the aggregate communication channel includes a first frequency portion in the first RF band and a second frequency portion in a second RF band among the plurality of RF bands, wherein each RF band in the plurality of RF bands does not overlap in frequency with any other RF band in the plurality of RF bands; in response to determining that the first channel in the first RF band is idle, transmitting, by the communication device, a first packet that reserves at least the first channel in the first RF band for a first particular time duration in connection with reserving the aggregate communication channel; in connection with determining that the first channel in the first RF band is idle, performing, at the communication device, one or more energy level measurements in a second channel in the second RF band to determine whether the second channel is idle; and transmitting, by the communication device, a second packet that reserves at least the second channel in the second RF band for a second particular time duration in connection with reserving the aggregate communication channel, wherein transmitting the second packet is in response to the one or more energy level measurements in the second channel indicating that the second channel has been idle for a defined time period immediately prior to transmitting the second packet.

In another embodiment, a communication device for operating in a plurality of RF bands comprises: a network interface device having one or more integrated circuit (IC) devices; a backoff counter implemented on the one or more IC devices; and one or more energy level sensors implemented on the one or more IC devices. The one or more IC devices are configured to: perform, using the back off counter, a backoff procedure to determine when a first channel in a first RF band, among the plurality of RF bands, is idle in connection with reserving an aggregate communication channel for a frame exchange, wherein the backoff procedure includes decrementing the backoff counter only when at least a portion of the first channel is determined to be idle, wherein the aggregate communication channel includes a first frequency portion in the first RF band and a second frequency portion in a second RF band among the plurality of RF bands, and wherein each RF band in the plurality of RF bands does not overlap in frequency with any other RF band in the plurality of RF bands; in response to determining that the first channel in the first RF band is idle, transmit a first packet that reserves at least the first channel in the first RF band for a first particular time duration in connection with reserving the aggregate communication channel; In connection with determining that the first channel in the first RF band is idle, perform, using the one or more energy level sensors, one or more energy level measurements in a second channel in the second RF band to determine whether the second channel is idle; and transmit a second packet that reserves at least the second channel in the second RF band for a second particular time duration in connection with reserving the aggregate communication channel, wherein transmitting the second packet is in response to carrier sensing in the second channel indicates that the second channel has been idle for a defined time period immediately prior to transmitting the second packet.

In yet another embodiment, a method for WLAN communications in a plurality of RF bands includes: receiving, at a first communication device, a first packet via a first channel in a first RF band among the plurality of RF bands, wherein each RF band in the plurality of RF bands does not overlap in frequency with any other RF band in the plurality of RF bands, wherein the first packet is from a second communication device; in connection with receiving the first packet via the first channel in the first RF band, performing, at the first communication device, one or more energy level measurements in a second channel in the second RF band to determine whether the second channel is idle for transmitting a second packet to the second communication device responsive to the first packet; and transmitting, by the first communication device, the second packet in the second RF band, wherein transmitting the second packet is in response to the one or more energy level measurements in the second channel indicating that the second channel has been idle for a defined time period immediately prior to transmitting the second packet.

In still another embodiment, a communication device for operating in a plurality of RF bands comprises: a network interface device having one or more IC devices; and one or more energy level sensors implemented on the one or more IC devices. The one or more IC devices are configured to: receive a first packet via a first channel in a first RF band among the plurality of RF bands, wherein each RF band in the plurality of RF bands does not overlap in frequency with any other RF band in the plurality of RF bands, wherein the first packet is from another communication device; in connection with receiving the first packet via the first channel in the first RF band, perform, using the one or more energy level sensors, one or more energy level measurements in a second channel in the second RF band to determine whether the second channel is idle for transmitting a second packet to the another communication device responsive to the first packet; and transmit the second packet in the second RF band, wherein transmitting the second packet is in response to the one or more energy level measurements in the second channel indicating that the second channel has been idle for a defined time period immediately prior to transmitting the second packet.

BRIEF DESCRIPTION OF THE DRAWINGS

FIG. 2A is a block diagram of an example physical layer (PHY) data unit transmitted by communication devices in the WLAN of FIG. 1, according to an embodiment.

FIG. 2B is a block diagram of an example preamble of the PHY data unit of FIG. 2A, according to an embodiment.

DETAILED DESCRIPTION

Figure 1:
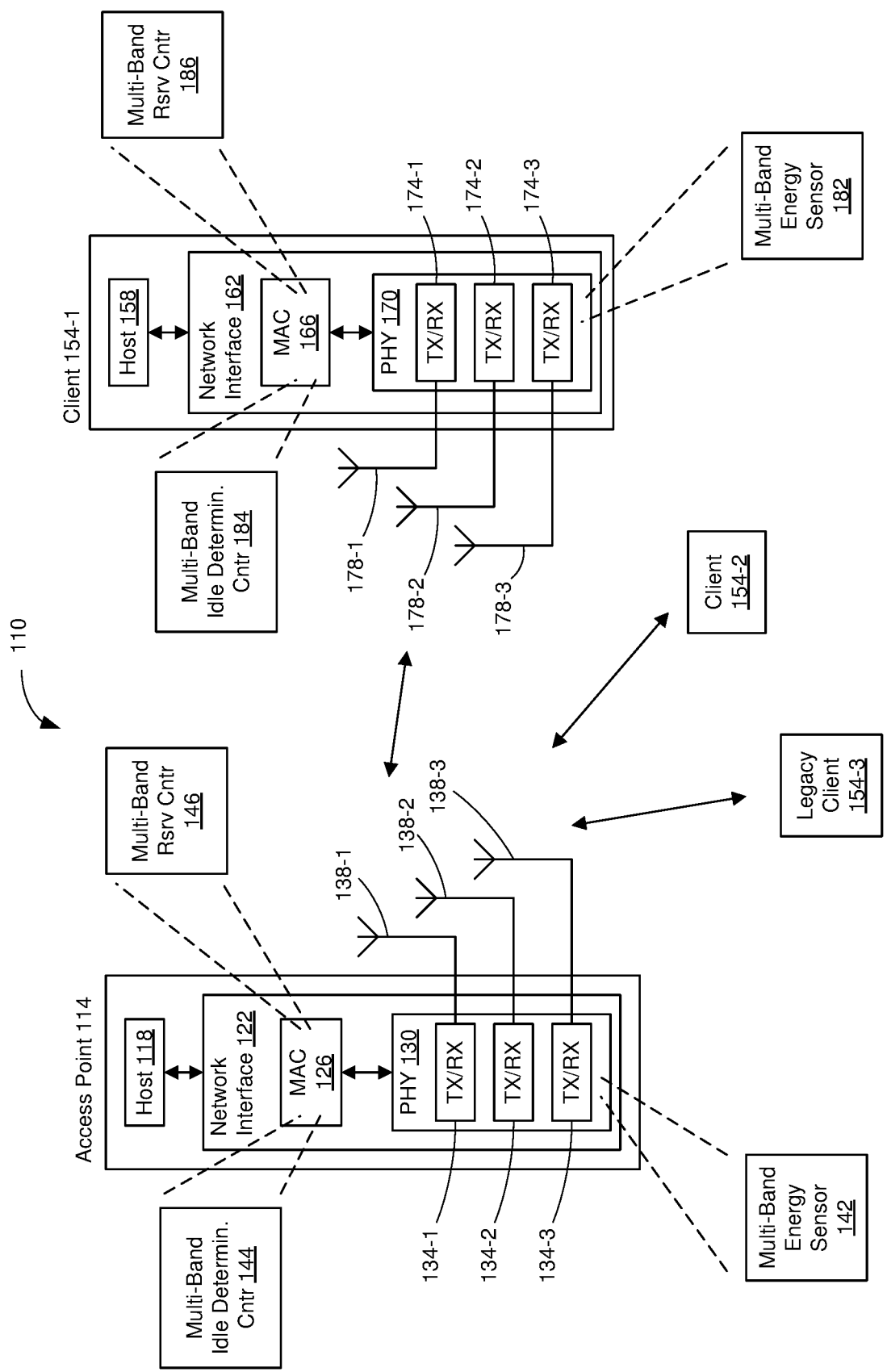
FIG. 1 is a block diagram of an example wireless local area network (WLAN), according to an embodiment.

The Federal Communication Commission (FCC) now permits wireless local area networks (WLANs) to operate in multiple radio frequency (RF) bands, e.g., the 2.4 GHz band (approximately 2.4 to 2.5 GHz), and the 5 GHz band (approximately 5.170 to 5.835 GHz). Recently, the FCC proposed that WLANs can also operate in the 6 GHz band (5.925 to 7.125 GHz). Current IEEE 802.11 Standard protocols only permit a WLAN to operate in one RF band at a time. For example, the IEEE 802.11n Standard protocol is defined only for operation in the 2.4 GHz band, whereas the IEEE 802.11ac Standard protocol is defined only for operation in the 5 GHz band. The IEEE 802.11ax Standard protocol, now under development, will permit a WLAN to operate in the 2.4 GHz band or the 5 GHz band, but not both the 2.4 GHz band and the 5 GHz band at the same time.

A future WLAN protocol, now under development, may permit multi-band operation in which a WLAN can use spectrum in multiple RF bands at the same time. For example, the future WLAN protocol may permit aggregation of spectrum in a first RF band with spectrum in a second RF band to form a composite communication channel that can be used to transmit packets that span the composite communication channel. As another example, the future WLAN protocol may employ frequency division duplex (FDD) techniques in which a first communication channel in a first RF band is used for one type of communications (e.g., downlink data transmissions) and a second communication channel in a second RF band is used for another type of communications (e.g., uplink data transmissions).

A wireless communication network with a plurality of communication devices should take into account interference that may result from multiple devices attempting to transmit simultaneously in a same communication channel. To reduce the likelihood of such interference occurring, a communication device attempting to communicate may reserve the communication channel for an interval of time so that the communication device can transmit one or more packets to one or more other communication devices and/or so that the communication device can receive one or more packets from one or more other communication devices.

Additionally, to reduce the likelihood of interference occurring in a network, a communication device attempting to transmit a packet may first make a determination of whether a communication channel is idle (e.g., another communication device is not currently transmitting in the communication channel or has not previously reserved the communication channel). If the communication device determines that the communication channel is not idle, the communication device will delay transmitting the packet until the communication device determines that the communication channel is idle.

With the future WLAN protocol described above, it will be helpful, at least in some embodiments, for a communication device to be able to reserve spectrum in multiple RF bands for simultaneous use by a WLAN, but media access control (MAC) features in the existing IEEE 802.11 Standard protocols only permit reserving spectrum within a single RF band at a given time. Thus, embodiments of various MAC techniques for reserving spectrum in multiple RF bands for simultaneous use by a WLAN are described below.

Additionally, with FDD communications contemplated by the future WLAN protocol described above, it will be helpful, at least in some embodiments, for a communication device to be able to determine whether spectrum in a first RF band is idle (e.g., for the purpose of transmitting an acknowledgment (ACK)) in response to receiving a packet in a second RF band, but MAC features in the existing IEEE 802.11 Standard protocols only contemplate communications within a single RF band at a time. Thus, embodiments of various MAC techniques for determining whether spectrum in a first RF band is idle (e.g., for the purpose of transmitting an ACK) in response to receiving a packet in a second RF band are described below.

Although embodiments of various MAC techniques are described below in the context of WLANs, the same or similar techniques may be utilized in other types of wireless communication systems such as personal area networks (PANs), mobile communication networks such as cellular networks, metropolitan area networks (MANs), satellite communication networks, etc.

FIG. 1 is a block diagram of an example multi-band wireless local area network (WLAN) 110, according to an embodiment. The WLAN 110 includes an access point (AP) 114 that comprises a host processor 118 coupled to a network interface device 122. The network interface device 122 includes one or more medium access control (MAC) processors 126 (sometimes referred to herein as "the MAC processor 126" for brevity) and one or more physical layer (PHY) processors 130 (sometimes referred to herein as "the PHY processor 130" for brevity). The PHY processor 130 includes a plurality of transceivers 134, and the transceivers 134 are coupled to a plurality of antennas 138. Although three transceivers 134 and three antennas 138 are illustrated in FIG. 1, the AP 114 includes other suitable numbers (e.g., 1, 2, 4, 5, etc.) of transceivers 134 and antennas 138 in other embodiments. In some embodiments, the AP 114 includes a higher number of antennas 138 than transceivers 134, and antenna switching techniques are utilized.

In an embodiment, the network interface device 122 includes multiple PHY processors 130 to facilitate multi-band communication, where respective PHY processors 130 correspond to respective RF bands. In another embodiment, the network interface device 122 includes a single PHY processor 130, where each transceiver 134 includes respective RF radios corresponding to respective RF bands to facilitate multi-band communication.

The network interface device 122 is implemented using one or more integrated circuits (ICs) configured to operate as discussed below. For example, the MAC processor 126 may be implemented, at least partially, on a first IC, and the PHY processor 130 may be implemented, at least partially, on a second IC. As another example, at least a portion of the MAC processor 126 and at least a portion of the PHY processor 130 may be implemented on a single IC. For instance, the network interface device 122 may be implemented using a system on a chip (SoC), where the SoC includes at least a portion of the MAC processor 126 and at least a portion of the PHY processor 130.

In an embodiment, the host processor 118 includes a processor configured to execute machine readable instructions stored in a memory device (not shown) such as a random access memory (RAM), a read-only memory (ROM), a flash memory, etc. In an embodiment, the host processor 118 may be implemented, at least partially, on a first IC, and the network device 122 may be implemented, at least partially, on a second IC. As another example, the host processor 118 and at least a portion of the network interface device 122 may be implemented on a single IC.

In various embodiments, the MAC processor 126 and/or the PHY processor 130 of the AP 114 are configured to generate data units, and process received data units, that conform to a WLAN communication protocol such as a communication protocol conforming to the IEEE 802.11 Standard or another suitable wireless communication protocol. For example, the MAC processor 126 may be configured to implement MAC layer functions, including MAC layer functions of the WLAN communication protocol, and the PHY processor 130 may be configured to implement PHY functions, including PHY functions of the WLAN communication protocol. For instance, the MAC processor 126 may be configured to generate MAC layer data units such as MAC service data units (MSDUs), MAC protocol data units (MPDUs), etc., and provide the MAC layer data units to the PHY processor 130. The PHY processor 130 may be configured to receive MAC layer data units from the MAC processor 126 and encapsulate the MAC layer data units to generate PHY data units such as PHY protocol data units (PPDUs) for transmission via the antennas 138. Similarly, the PHY processor 130 may be configured to receive PHY data units that were received via the antennas 138, and extract MAC layer data units encapsulated within the PHY data units. The PHY processor 130 may provide the extracted MAC layer data units to the MAC processor 126, which processes the MAC layer data units.

PHY data units are sometimes referred to herein as "packets", and MAC layer data units are sometimes referred to herein as "frames".

In connection with generating one or more radio frequency (RF) signals for transmission, the PHY processor 130 is configured to process (which may include modulating, filtering, etc.) data corresponding to a PPDU to generate one or more digital baseband signals, and convert the digital baseband signal(s) to one or more analog baseband signals, according to an embodiment. Additionally, the PHY processor 130 is configured to upconvert the one or more analog baseband signals to one or more RF signals for transmission via the one or more antennas 138.

In connection with receiving one or more RF signals, the PHY processor 130 is configured to downconvert the one or more RF signals to one or more analog baseband signals, and to convert the one or more analog baseband signals to one or more digital baseband signals. The PHY processor 130 is further configured to process (which may include demodulating, filtering, etc.) the one or more digital baseband signals to generate a PPDU.

The PHY processor 130 includes amplifiers (e.g., a low noise amplifier (LNA), a power amplifier, etc.), a radio frequency (RF) downconverter, an RF upconverter, a plurality of filters, one or more analog-to-digital converters (ADCs), one or more digital-to-analog converters (DACs), one or more discrete Fourier transform (DFT) calculators (e.g., a fast Fourier transform (FFT) calculator), one or more inverse discrete Fourier transform (IDFT) calculators (e.g., an inverse fast Fourier transform (IFFT) calculator), one or more modulators, one or more demodulators, etc.

The PHY processor 130 is configured to generate one or more RF signals that are provided to the one or more antennas 138. The PHY processor 130 is also configured to receive one or more RF signals from the one or more antennas 138.

The MAC processor 126 is configured to control the PHY processor 130 to generate one or more RF signals by, for example, providing one or more MAC layer data units (e.g., MPDUs) to the PHY processor 130, and optionally providing one or more control signals to the PHY processor 130, according to some embodiments. In an embodiment, the MAC processor 126 includes a processor configured to execute machine readable instructions stored in a memory device (not shown) such as a RAM, a read ROM, a flash memory, etc. In another embodiment, the MAC processor 126 includes a hardware state machine.

The PHY processor 130 includes a multi-RF-band (sometimes referred to herein as "multi-band") energy sensor 142 that is configured to measure energy levels in communication channels in multiple RF bands for the purpose of determining whether the communication channels are idle. The multi-band energy sensor 142 includes respective energy level sensors corresponding to respective RF bands, in an embodiment. The multi-band energy sensor 142 includes a single energy level sensor that is time-shared to measure energy levels of communication channels in different RF bands, in another embodiment.

The MAC processor 126 includes a multi-band idle determination controller 144 that is configured to determine whether communication channels in multiple RF bands are idle. The multi-band idle determination controller 144 includes one or more backoff counters for performing backoff procedures (to be explained in more detail below) in connection with multiple communication channels in multiple RF bands, according to an embodiment. As will be described further below, the backoff procedure involves waiting a period of time before attempting to use a communication channel, according to an embodiment.

The multi-band idle determination controller 144 also includes one or more network allocation vector (NAV) counters for monitoring use of multiple communication channels in multiple RF bands, according to an embodiment. For example, when the access point 114 receives a packet, the multi-band idle determination controller 144 sets a NAV counter according to a value in a duration field in a MAC header of the packet, at least in some situations, according to an embodiment. The multi-band idle determination controller 144 monitors the NAV counter to determine when the transmission of the packet has ended. Some packets are configured for reserving a channel for a desired time period and the duration field in the MAC header of the packet is set to the desired time period. When receiving such a packet, the multi-band idle determination controller 144 sets a NAV counter according to the value in the duration field in a MAC header of the packet. The multi-band idle determination controller 144 monitors the NAV counter to determine when the reservation of the channel has ended.

The multi-band idle determination controller 144 uses the energy levels measured by the multi-band energy sensor 142, the backoff counter(s), and the NAV counter(s), to determine when communication channels among multiple RF bands are idle.

At least some actions performed by the multi-band idle determination controller 144 are implemented using a processor executing machine readable instructions, according to an embodiment. At least some actions performed by the multi-band idle determination controller 144 are implemented using a hardware circuit such as a hardware state machine, according to another embodiment. At least some actions performed by the multi-band idle determination controller 144 are implemented using a combination of i) a processor executing machine readable instructions and ii) a hardware circuit such as a hardware state machine, according to another embodiment.

The MAC processor 126 also includes a multi-band channel reservation controller 146 that is configured to reserve communication channels in multiple RF bands. The multi-band reservation controller 146 reserves a communication channel by controlling the network interface device 122 to transmit a control frame that informs other communication devices that the network interface device 122 is reserving the communication channel for a period of time, according to an embodiment. For example, the multi-band reservation controller 146 controls the network interface device 122 to transmit a control frame such as a request-to-send (RTS) frame, a clear-to-send-to-self (CTS-to-self) frame, etc., that includes a field (e.g., a duration field) that indicates a period of time for which the communication channel is reserved. The multi-band channel reservation controller 146 uses idle determinations for communication channels in multiple RF bands made by the multi-band idle determination controller 144 in connection with reserving communication channels. For example, the multi-band channel reservation controller 146 reserves a communication channel after (and/or in response to) the multi-band idle determination controller 144 has determined that the communication channel is idle, according to an embodiment.

At least some actions performed by the multi-band channel reservation controller 146 are implemented using a processor executing machine readable instructions, according to an embodiment. At least some actions performed by the multi-band channel reservation controller 146 are implemented using a hardware circuit such as a hardware state machine, according to another embodiment. At least some actions performed by the multi-band channel reservation controller 146 are implemented using a combination of i) a processor executing machine readable instructions and ii) a hardware circuit such as a hardware state machine, according to another embodiment.

The WLAN 110 includes a plurality of client stations 154. Although three client stations 154 are illustrated in FIG. 1, the WLAN 110 includes other suitable numbers (e.g., 1, 2, 4, 5, 6, etc.) of client stations 154 in various embodiments. The client station 154-1 includes a host processor 158 coupled to a network interface device 162. The network interface device 162 includes one or more MAC processors 166 (sometimes referred to herein as "the MAC processor 166" for brevity) and one or more PHY processors 170 (sometimes referred to herein as "the PHY processor 170" for brevity). The PHY processor 170 includes a plurality of transceivers 174, and the transceivers 174 are coupled to a plurality of antennas 178. Although three transceivers 174 and three antennas 178 are illustrated in FIG. 1, the client station 154-1 includes other suitable numbers (e.g., 1, 2, 4, 5, etc.) of transceivers 174 and antennas 178 in other embodiments. In some embodiments, the client station 154-1 includes a higher number of antennas 178 than transceivers 174, and antenna switching techniques are utilized.

The network interface device 162 is implemented using one or more ICs configured to operate as discussed below. For example, the MAC processor 166 may be implemented on at least a first IC, and the PHY processor 170 may be implemented on at least a second IC. As another example, at least a portion of the MAC processor 166 and at least a portion of the PHY processor 170 may be implemented on a single IC. For instance, the network interface device 162 may be implemented using an SoC, where the SoC includes at least a portion of the MAC processor 166 and at least a portion of the PHY processor 170.

In an embodiment, the host processor 158 includes a processor configured to execute machine readable instructions stored in a memory device (not shown) such as a RAM, a ROM, a flash memory, etc. In an embodiment, the host processor 158 may be implemented, at least partially, on a first IC, and the network device 162 may be implemented, at least partially, on a second IC. As another example, the host processor 158 and at least a portion of the network interface device 162 may be implemented on a single IC.

In various embodiments, the MAC processor 166 and the PHY processor 170 of the client station 154-1 are configured to generate data units, and process received data units, that conform to the WLAN communication protocol or another suitable communication protocol. For example, the MAC processor 166 may be configured to implement MAC layer functions, including MAC layer functions of the WLAN communication protocol, and the PHY processor 170 may be configured to implement PHY functions, including PHY functions of the WLAN communication protocol. The MAC processor 166 may be configured to generate MAC layer data units such as MSDUs, MPDUs, etc., and provide the MAC layer data units to the PHY processor 170. The PHY processor 170 may be configured to receive MAC layer data units from the MAC processor 166 and encapsulate the MAC layer data units to generate PHY data units such as PPDUs for transmission via the antennas 178. Similarly, the PHY processor 170 may be configured to receive PHY data units that were received via the antennas 178, and extract MAC layer data units encapsulated within the PHY data units. The PHY processor 170 may provide the extracted MAC layer data units to the MAC processor 166, which processes the MAC layer data units.

The PHY processor 170 is configured to downconvert one or more RF signals received via the one or more antennas 178 to one or more baseband analog signals, and convert the analog baseband signal(s) to one or more digital baseband signals, according to an embodiment. The PHY processor 170 is further configured to process the one or more digital baseband signals to demodulate the one or more digital baseband signals and to generate a PPDU. The PHY processor 170 includes amplifiers (e.g., an LNA, a power amplifier, etc.), an RF downconverter, an RF upconverter, a plurality of filters, one or more ADCs, one or more DACs, one or more DFT calculators (e.g., an FFT calculator), one or more IDFT calculators (e.g., an IFFT calculator), one or more modulators, one or more demodulators, etc.

The PHY processor 170 is configured to generate one or more RF signals that are provided to the one or more antennas 178. The PHY processor 170 is also configured to receive one or more RF signals from the one or more antennas 178.

The MAC processor 166 is configured to control the PHY processor 170 to generate one or more RF signals by, for example, providing one or more MAC layer data units (e.g., MPDUs) to the PHY processor 170, and optionally providing one or more control signals to the PHY processor 170, according to some embodiments. In an embodiment, the MAC processor 166 includes a processor configured to execute machine readable instructions stored in a memory device (not shown) such as a RAM, a ROM, a flash memory, etc. In an embodiment, the MAC processor 166 includes a hardware state machine.

The PHY processor 170 includes a multi-band energy sensor 182 that is configured to measure energy levels in communication channels in multiple RF bands for the purpose of determining whether the communication channels are idle. The multi-band energy sensor 182 has a structure the same as or similar to the multi-band energy sensor 142, according to an embodiment.

The MAC processor 166 includes a multi-band idle determination controller 184 that is configured to determine whether communication channels in multiple RF bands are idle. The multi-band idle determination controller 184 has a structure the same as or similar to the multi-band idle determination controller 144, according to an embodiment.

The MAC processor 166 also includes a multi-band channel reservation controller 186 that is configured to reserve communication channels in multiple RF bands. The multi-band channel reservation controller 186 has a structure the same as or similar to the multi-band channel reservation controller 146, according to an embodiment.

In an embodiment, each of the client stations 154-2 and 154-3 has a structure that is the same as or similar to the client station 154-1. In an embodiment, one or more of the client stations 154-2 and 154-3 has a different suitable structure than the client station 154-1. Each of the client stations 154-2 and 154-3 has the same or a different number of transceivers and antennas. For example, the client station 154-2 and/or the client station 154-3 each have only two transceivers and two antennas (not shown), according to an embodiment.

In an embodiment, the AP 114 and one or more of the client stations 154 (e.g., client stations 154-1 and 154-2) are configured for concurrent multi-band communications, i.e., operate according to a communication protocol that permits concurrent operation of a single wireless network across multiple RF bands and includes hardware that is capable of concurrent communications over multiple RF bands. Such communication devices are referred to herein as "multi-band communication devices". In an embodiment, at least one client station 154 (e.g., the client station 154-3) may include hardware or may operate according to a communication protocol (e.g., a legacy communication protocol) that is not configured for multi-band communications (i.e., the protocol only permits a wireless network to operate in a single RF band at a given time), and may operate only in one of the multiple RF bands (at a given time) being used by multi-band devices. Such communication devices are referred to herein as "single-band communication devices".

FIG. 2A is a diagram of an example PPDU 200 that the network interface device 122 (FIG. 1) is configured to generate and transmit to one or more client stations 154 (e.g., the client station 154-1), according to an embodiment. The network interface device 162 (FIG. 1) may also be configured to transmit data units the same as or similar to the PPDU 200 to the AP 114. The PPDU 200 may occupy a 20 MHz bandwidth or another suitable bandwidth. Data units similar to the PPDU 200 occupy other suitable bandwidth such as 40 MHz, 60 MHz, 80 MHz, 100 MHz, 120 MHz, 140 MHz, 160 MHz, 180 MHz, 200 MHz, etc., for example, or other suitable bandwidths, in other embodiments.

The PPDU 200 includes a PHY preamble 204 and a PHY data portion 208. The PHY preamble 204 may include at least one of a legacy portion 212 and a non-legacy portion 216, in at least some embodiments. In an embodiment, the legacy portion 212 is configured to be processed by legacy communication devices in the WLAN 110 (i.e., communication devices that operate according to a legacy communication protocol), enabling the legacy communication devices to detect the PPDU 200 and to obtain PHY information corresponding to the PPDU 200, such as a duration of the PPDU 200. The PHY data portion may include a single MPDU, or may include an aggregated MPDU (A-MPDU) comprising of a plurality of MPDUs.

FIG. 2B is a diagram of an example PHY preamble 220. In an embodiment, the PHY preamble 220 corresponds to the PHY preamble 204. In an embodiment, the PHY preamble 220 is included in the legacy portion 212. In another embodiment, the PHY preamble 220 is included in the non-legacy portion 216. The PHY preamble 220 includes one or more short training fields (STFs) 224, one or more long training field (LTFs) 228, and one or more signal fields (SIGs) 232. In an embodiment, the STFs 224 and the LTFs 228 are used for packet detection, automatic gain control (AGC), frequency offset estimation, channel estimation, etc. In an embodiment, the SIGs 232 are used to signal PHY communication parameters (e.g., a length of the PPDU 200, a modulation and coding scheme (MCS) used in the PHY data portion 208, a number of spatial streams used in the PHY data portion 208, a frequency bandwidth of the PPDU 200, etc.) corresponding to the PPDU 200.

In some embodiments, the PHY preamble 220 omits one or more of the fields 224-232. In some embodiments, the PHY preamble 220 includes one or more additional fields not illustrated in FIG. 2B. In some embodiments, the order of the fields 224-232 is different than illustrated in FIG. 2B. In an embodiment, the PPDU 200 is generated and transmitted as a sequence of orthogonal frequency division multiplexing (OFDM) symbols. In an embodiment, each of the STF 224, the LTF 228, the SIG 232, and the data portion 208 comprises one or more OFDM symbols.

In an embodiment, the PPDU 200 is a single-user (SU) data unit from one of the client stations 154 to the AP 114, or from the AP 114 to one of the client station 154. In another embodiment, the PPDU 200 is a multi-user (MU) orthogonal frequency division multiple access (OFDMA) data unit in which independent data streams are transmitted to multiple client stations 154 using respective sets of OFDM tones allocated to the client stations 154. For example, in an embodiment, available OFDM tones (e.g., OFDM tones that are not used as DC tone and/or guard tones) are segmented into multiple resource units (RUs), and each of the multiple RUs is allocated to data to one or more client stations 154. In an embodiment, the independent data streams in respective allocated RUs are further transmitted using respective spatial streams, allocated to the client stations 154, using multiple-input multiple-output (MIMO) techniques. In an embodiment, the PPDU 200 is an MU-MIMO PHY data unit in which independent data streams are transmitted to multiple client stations 154 using respective spatial streams allocated to the client stations 154.

As discussed above, the WLAN 110 may simultaneously utilize multiple RF bands for communication. In an embodiment, the RF spectrum is organized as a plurality of individual communication channels (e.g., 20 MHz channels or channels having another suitable bandwidth) across multiple RF bands. In an embodiment, a composite communication channel can be formed by aggregating multiple individual communication channels (sometimes referred to herein as "component channels" or "sub-channels"). For instance, a 40 MHz composite channel may be formed by combining two 20 MHz component channels, an 80 MHz composite channel may be formed by combining four 20 MHz component channels, a 160 MHz composite channel may be formed by combining eight 20 MHz component channels, etc. In some situations, the composite channel consists of contiguous (in frequency) component channels, whereas in other situations the composite channel comprises two sets of one or more component channels, with a gap in frequency between the two sets of component channel(s). In some embodiments, the composite channel comprises three or more sets of one or more component channels, with respective gaps in frequency between adjacent sets of component channel(s). In some embodiments, the component channels of a composite channel are located within two or more different RF bands.

In an embodiment, the PPDU 200 has a 20 MHz frequency bandwidth and is transmitted in a 20 MHz channel. In other embodiments, the PPDU 200 may have a frequency bandwidth of 40 MHz, 80 MHz, 100 MHz, 120 MHz, etc., and is correspondingly transmitted over a 40 MHz, 80 MHz, 100 MHz, 120 MHz, etc., channel, respectively.

As described above with reference to FIG. 1, at least the AP 114 and the client station 154-1 are configured for multi-band communication. For example, a communication device transmits a packet in an aggregate communication channel that comprises spectrum in multiple RF bands, according to an embodiment. As another example, a communication device simultaneously transmits a first packet in a first communication channel in a first RF band, and transmits a second packet in a second communication channel in a second RF band. As another example, a communication device simultaneously receives a first packet in a first communication channel in a first RF band, and receives a second packet in a second communication channel in a second RF band. As another example, a communication device simultaneously transmits a first packet in a first communication channel in a first RF band, and receives a second packet in a second communication channel in a second RF band. As used herein, the term "aggregate communication channel" refers to multiple communication channels aggregated for the purpose of transmitting packets that span all of the multiple communication channels, or for using the multiple communication channels for frequency division duplex communications.

In various embodiments, transmission/reception of a first signal in a first RF band is asynchronous with transmission/reception of a second signal in a second RF band. For instance, in an embodiment, one or both of corresponding start times and end times of the first signal and the second signal may be different.

In other embodiments, the transmission/reception of a first signal in a first RF band is synchronized with transmission/reception of a second signal in a second RF band. For instance, in an embodiment, one or both of corresponding start times and end times of the first signal and the second signal are the same.

In some embodiments, a first communication channel in a first RF band is separated in frequency from a second communication channel in a second RF band, i.e., there is a gap in frequency between the first communication channel and the second communication channel. In an embodiment, the gap in frequency is at least 1 GHz. In some embodiments, a first frequency bandwidth of a first communication channel in the first RF band is different than a second frequency bandwidth in a second communication channel in a second RF band. In an embodiment, a first composite communication channel in a first RF band and a second composite communication channel in a second RF band consist of different numbers of component channels.

Figure 3A:
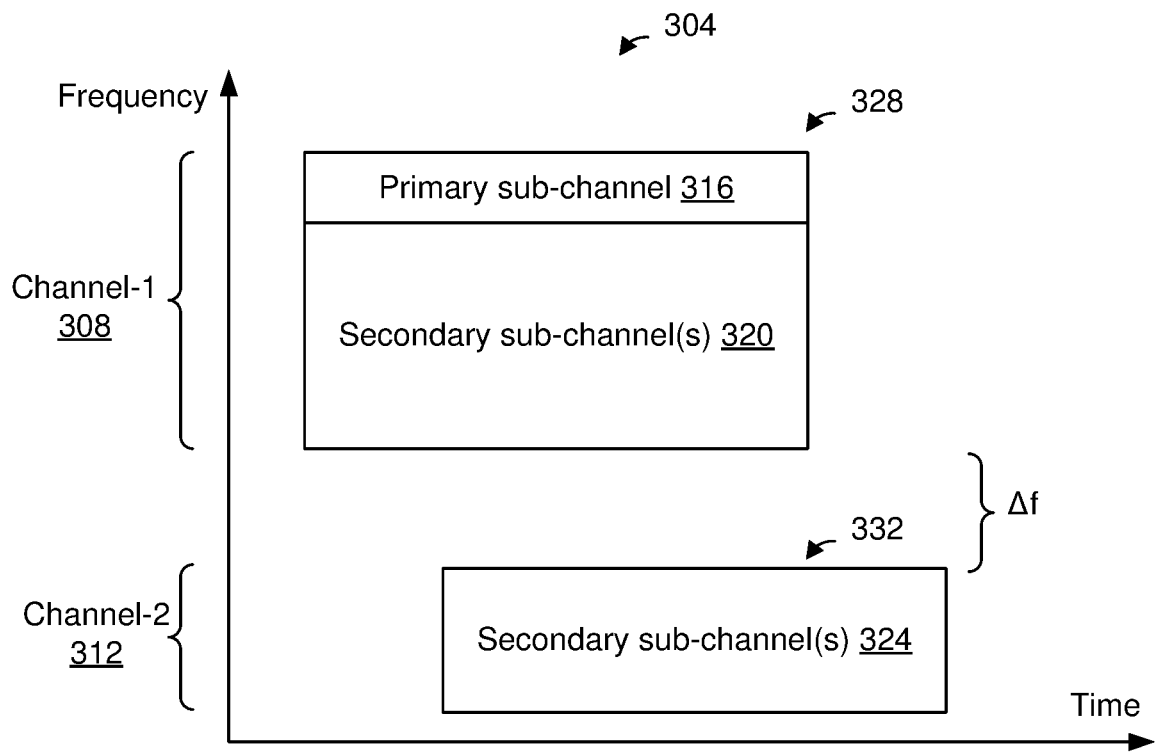
FIG. 3A is a diagram of an example channelization scheme and example signal transmissions corresponding to multi-channel communication, according to an embodiment.

FIG. 3A is a diagram 304 of an example channelization scheme and example signal transmissions corresponding to multi-channel communication that is implemented by the WLAN 110 or another suitable wireless network, according to an embodiment.

The channelization scheme 304 utilizes a first communication channel 308 (also referred to herein as "channel-1 308") and a second communication channel 312 (also referred to herein as "channel-2 312"). Channel-1 308 comprises one or more component channels, and channel-2 312 comprises one or more component channels. In an embodiment, channel-1 308 is within a first RF band and channel-2 312 is within a second RF band. In another embodiment, channel-1 308 and channel-2 312 are within a same RF band. In an embodiment, channel-1 308 and channel-2 312 are separated in frequency by Δf Hz. In an embodiment, Δf is at least 1 GHz. In another embodiment, Δf is less than 1 GHz (e.g., less than 10 MHz, tens of MHz, hundreds of MHz, etc.).

The channelization scheme 304 corresponds to an aggregation of channel-1 308 and channel-2 312 into an aggregate communication channel that comprises channel-1 308 and channel-2 312.

In the channelization scheme 304, a single component channel 316 in channel-1 304 is designated as a primary sub-channel Any remaining one or more component channels (if any) in channel-1 308 are designated as secondary sub-channel(s) 320. Similarly, one or more component channels in channel-2 312 are designated as secondary sub-channel(s) 324.

In the channelization scheme 304, a communication device (e.g., the client station 154-1, the AP 114) belonging to the wireless network must be configured to operate in at least the primary sub-channel 316. Multi-band communication devices are operational in both channel-1 308 and channel-2 312. Therefore, the AP 114, and the client station 154-1 may transmit/receive simultaneously in channel-1 308 and in channel-2 312. Further, a single-channel communication device (e.g., the legacy client station 154-3) may be operational only in channel-1 308. Therefore, the legacy client station 154-3 is only allowed to transmit and receive in channel-1 308 that includes the primary sub-channel 316.

In the channelization scheme 304, each communication device in the wireless network maintains a NAV counter associated with the primary sub-channel 316. For example, the NAV counter is set based on packets received via the primary sub-channel 316 (e.g., overlapping with the primary sub-channel 316).

FIG. 3A further illustrates a packet 328 and a packet 332 transmitted over channel-1 308 and channel-2 312, respectively. Transmission/reception of the packet 328 and the packet 332 occurs simultaneously (e.g., transmission/reception of the packet 328 and the packet 332 overlaps in time) and asynchronously. In another embodiment, transmission/reception of the packet 328 and the packet 332 occurs simultaneously and synchronously. In another embodiment in which transmission in channel-1 308 and channel-2 312 is synchronous, a single packet is transmitted across channel-1 308 and channel-2 312 (which are aggregated to form a composite channel).

While FIG. 3A illustrates that the signal transmission 328 and the signal transmission 332 overlap in time, in other embodiments, signal transmission 328 and signal transmission 332 do not overlap in time.

Figure 3B:
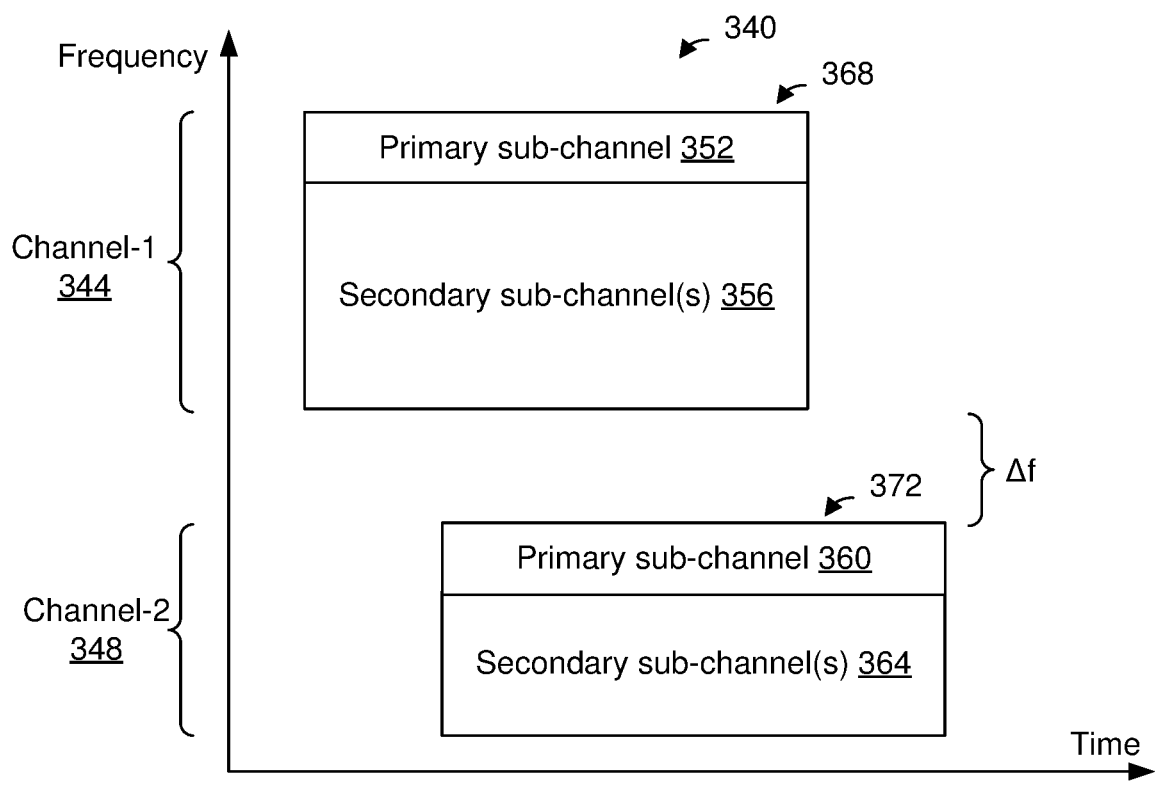
FIG. 3B is a diagram of another example channelization scheme and example signal transmissions corresponding to multi-channel communication, according to another embodiment.

FIG. 3B is a diagram 340 illustrating another example channelization scheme and signal transmissions corresponding to multi-channel communication that is implemented by the WLAN 110 or another suitable wireless network, according to another embodiment.

The channelization scheme 340 includes a first communication channel 344 (also referred to herein as "channel-1 344") and a second communication channel 348 (also referred to herein as "channel-2 348"). Channel-1 344 comprises one or more component channels, and channel-2 348 comprises one or more component channels. In an embodiment, channel-1 344 and channel-2 348 are separated in frequency by Δf Hz.

The channelization scheme 340 corresponds to an aggregation of channel-1 344 and channel-2 348 into an aggregate communication channel that comprises channel-1 340 and channel-2 348.

In the channelization scheme 340, a component channel in each of channel-1 344 and channel-2 348 is designated as a respective primary sub-channel. In the channelization scheme 340, a first component channel 352 in channel-1 344 is designated as a first primary sub-channel, and a second component channel 360 in channel-2 348 is designated as a second primary sub-channel Remaining one or more component channels (if any) in channel-1 344 are designated as secondary sub-channel(s) 356, and remaining one or more component channels (if any) in channel-2 348 are designated as secondary sub-channel(s) 364.

In the channelization scheme 304, a communication device (e.g., the client station 154-1, the AP 114) belonging to the wireless network must be configured to operate in at least one of the primary sub-channel 352 or the primary sub-channel 360, according to an embodiment. Multi-band communication devices are operational in both channel-1 344 and channel-2 348. Therefore, the AP 114, and the client station 154-1 may transmit/receive simultaneously in channel-1 344 and in channel-2 348. Further, a single-channel communication device (e.g., the legacy client station 154-3) may be operational in either channel-1 344 or channel-2 348, according to an embodiment.

FIG. 3B further illustrates transmission of a packet 368 over channel-1 344 and a transmission of a packet 372 over the channel-2 348. Transmission/reception of the packet 368 and the packet 372 occurs simultaneously (e.g., transmission/reception of the packet 368 and the packet 372 overlaps in time) and asynchronously. In another embodiment, transmission/reception of the packet 368 and the packet 372 occurs simultaneously and synchronously. In another embodiment in which transmission in channel-1 344 and channel-2 348 is synchronous, a single packet is transmitted across channel-1 344 and channel-2 348 (which are aggregated to form a composite channel).

While FIG. 3B illustrates that the signal transmission 368 and the signal transmission 372 overlap in time, in other embodiments, signal transmission 368 and signal transmission 372 do not overlap in time.

Referring now to FIGS. 3A and 3B, according to an embodiment, communication devices are free to transmit any type of frame on either of channel-1 or channel-2. In other embodiments, each of channel-1 and channel-2 is restricted to one or more particular types of frames. For example, channel-1 is reserved for transmission of data frames, management frames, and control frames (e.g., one or more of acknowledgment (ACK) frames, block acknowledgment (BlockAck) frames, RTS frames, clear-to-send (CTS) frames, CTS-to-self frames, trigger frames, etc.) that can be included in A-MPDUs, whereas channel-2 is reserved for control frames, according to an embodiment. As another example, channel-1 is reserved for transmission of data frames from the AP 114, management frames from the AP 114, and control frames that can be included in A-MPDUs, whereas channel-2 is reserved for data frames from the client stations 154, management frames from client stations 154, and control frames, according to another embodiment. In another embodiment, data frames are transmitted on channel-1 and are not transmitted on channel-2, whereas ACK frames and BlockAck frames are transmitted on channel-2 and are not transmitted on channel-1.

In other embodiments, each of channel-1 and channel-2 is restricted to transmissions by a particular communication device or devices. For example, according to an embodiment, channel-1 is reserved for transmissions from the AP, whereas channel-2 is reserved for transmissions from the client stations.

As discussed above, communication devices in the wireless network 110 may reserve a communication channel, such as channel 1 or channel 2, for period of time. For example, a communication device may transmit a control frame such as RTS frame, a CTS-to-self frame, etc., that includes a field (e.g., a duration field) that indicates a period of time for which the communication channel is reserved. The time period for which the communication channel is reserved is sometimes referred to herein as a transmit opportunity period (TXOP).

In the context of a multi-channel system such as described with reference to FIGS. 3A and 3B, it is sometimes useful for a communication device to establish TXOPs in both channel-1 and channel-2. For example, if the AP 114 has one or more data frames to transmit on both channel-1 and channel-2, it is useful for the AP 114 to establish TXOPs in both channel-1 and channel-2, according to an embodiment. As another example, if one or more client stations 154 have one or more data frames to transmit to the AP 114 on both channel-1 and channel-2, it is useful for the AP 114 to establish TXOPs in both channel-1 and channel-2, according to an embodiment. As another example, in a scenario in which the AP 114 transmits data frames on channel-1 and receives ACKs/BlockAcks on channel-2, it is useful for the AP 114 to establish a TXOP in channel-1 for transmission of the data frames and to establish a TXOP in channel-2 for client station(s) 154 to transmit the ACKs/BlockAcks, according to an embodiment. In another example, if the AP 114 has one or more data frames to transmit on channel-1, and also knows that one or more client stations 154 have one or more data frames to transmit to the AP 114 on channel-2, it is useful for the AP 114 to establish a TXOP in channel-1 for transmission of data frames by the AP 114, and to establish a TXOP in channel-2 for transmission of data frames by the client station(s) 154, according to an embodiment.

In an embodiment, TXOPs in channel-1 and channel-2 are restricted to having a same start time and a same end time. In another embodiment, TXOPs in channel-1 and channel-2 are restricted to having a same start time but may have different end times. In another embodiment, TXOPs in channel-1 and channel-2 are restricted to having a same end time but may have different start times. In another embodiment, TXOPs in channel-1 and channel-2 may have different start times and different end times. In some embodiments, TXOPs in channel-1 and channel-2 are restricted to having a same duration. In other embodiments, TXOPs in channel-1 and channel-2 may have different durations.

A communication device reserves TXOPs by transmitting one or more packets over one or more communication channels in which TXOPs are to be reserved, where the one or more packets include frames that indicate durations of the TXOPs. In an embodiment, a packet transmitted to reserve a TXOP for a composite channel spans the bandwidth of the composite channel and includes an instance of a frame (e.g., an RTS frame, a CTS-to-self frame, etc.) for reserving the TXOP in each component channel. For instance, with reference to FIG. 3A, a communication device, intending to reserve both the channel-1 308 and the channel-2 312, transmits a first packet in channel-1 308, where the first packet includes an instance of a frame (e.g., an RTS frame, a CTS-to-self frame, etc.) for reserving the TXOP in each of the primary sub-channel 316 and the secondary sub-channel(s) 320; and transmits a second packet in channel-2 312, where the second packet includes an instance of a frame (e.g., an RTS frame, a CTS-to-self frame, etc.) for reserving the TXOP in each of the secondary sub-channel(s) 324. The first packet transmitted in channel-1 308 includes an indication of a TXOP duration corresponding to the channel-1 308, and the second packet transmitted in channel-2 312 includes an indication of a TXOP duration corresponding to channel-2 312.

Similarly, with reference to FIG. 3B, a communication device, intending to reserve both the channel-1 344 and the channel-2 348, transmits a first packet in channel-1 344, where the first packet includes an instance of a frame (e.g., an RTS frame, a CTS-to-self frame, etc.) for reserving the TXOP in each of the primary sub-channel 352 and the secondary sub-channel(s) 356; and transmits a second packet in channel-2 348, where the second packet includes an instance of a frame (e.g., an RTS frame, a CTS-to-self frame, etc.) for reserving the TXOP in each of the primary sub-channel 360 and the secondary sub-channel(s) 364. The first packet transmitted in channel-1 344 includes an indication of a TXOP duration corresponding to the channel-1 344, and the second packet transmitted in channel-2 348 includes an indication of a TXOP duration corresponding to channel-2 348.

Referring again to FIG. 1, as discussed above, each communication device in the WLAN 110 includes one or more NAV counters for monitoring use of communication channels, according to an embodiment. A communication device uses a NAV counter to monitor a TXOP established by another communication device, in an embodiment. For example, when the access point 114 receives a packet that includes an RTS, the multi-band idle determination controller 144 sets a NAV counter according to a value in a duration field in the RTS, at least in some situations, according to an embodiment. When the NAV counter reaches zero, this indicates the communication channel is no longer being used, e.g., the TXOP has ended.

Referring again to FIGS. 3A and 3B, in some embodiments in which only channel-1 includes a primary channel, a communication device includes a single NAV counter for monitoring both channel-1 and channel-2. In such embodiments, the communication device monitors the single NAV counter when determining whether channel-1 is idle and when determining whether channel-2 is idle. In some embodiments in which both channel-1 and channel-2 include respective primary channels, a communication device includes a first NAV counter for monitoring channel-1 and a second NAV counter for monitoring channel-2. In such embodiments, the communication device monitors the first NAV counter when determining whether channel-1 is idle and monitors the second NAV counter when determining whether channel-2 is idle.

In an embodiment, prior to reserving a TXOP in one or more communication channels (e.g., channel-1 and/or channel-2), a communication device uses a clear channel assessment (CCA) mechanism to determine if the communication channel(s) is/are busy or idle.

In an embodiment, the CCA procedure includes performing a virtual carrier sense (CS) operation. The virtual CS operation includes determining whether a NAV counter associated with the communication channel indicates the communication channel is busy, according to an embodiment. For example, a non-zero value of the NAV counter indicates the communication channel is busy, whereas a zero value of the NAV counter indicates the communication channel is idle.

In an embodiment, the CCA procedure also includes a physical CS operation, which includes the communication device measuring a signal energy level in a sub-channel and comparing the measured signal energy level to a threshold, according to an embodiment. For example, when the measured signal energy level exceeds the threshold, the communication device determines that the sub-channel is busy, whereas the measured signal energy level being below the threshold the indicates the sub-channel is idle. In an embodiment, the threshold varies depending at least on whether a signal corresponding to the measured signal energy level corresponds to a valid WLAN signal. For example, the threshold is lower when the measured signal energy level corresponds to a valid WLAN signal as compared to when the measured signal energy level does not correspond to a valid WLAN signal.

Prior to transmitting a packet, a communication device performs a backoff procedure. The backoff procedure involves using a backoff timer to determine when the communication device is permitted to transmit. The backoff counter is loaded with a value chosen randomly or pseudo-randomly so that backoff timers of different communication devices in the network tend to reach zero at different times. The backoff counter begins decrementing when a packet transmission by another device ends or a previous TXOP ends, for example. While the communication device determines that a communication channel is idle (e.g., using the CCA procedure described above), the communication device decrements the backoff timer. When the communication device determines that the communication medium is busy, the communication device pauses the backoff timer and does not resume decrementing the backoff timer until the communication medium is subsequently determined to be idle. Generally, if the communication channel is still idle when the backoff timer reaches zero, the communication device determines that the communication device is free to transmit. On the other hand, if the communication medium is busy when the backoff timer reaches zero, the communication device reloads the backoff timer with a new randomly or pseudo-randomly chosen value and the process repeats.

Figure 4A:
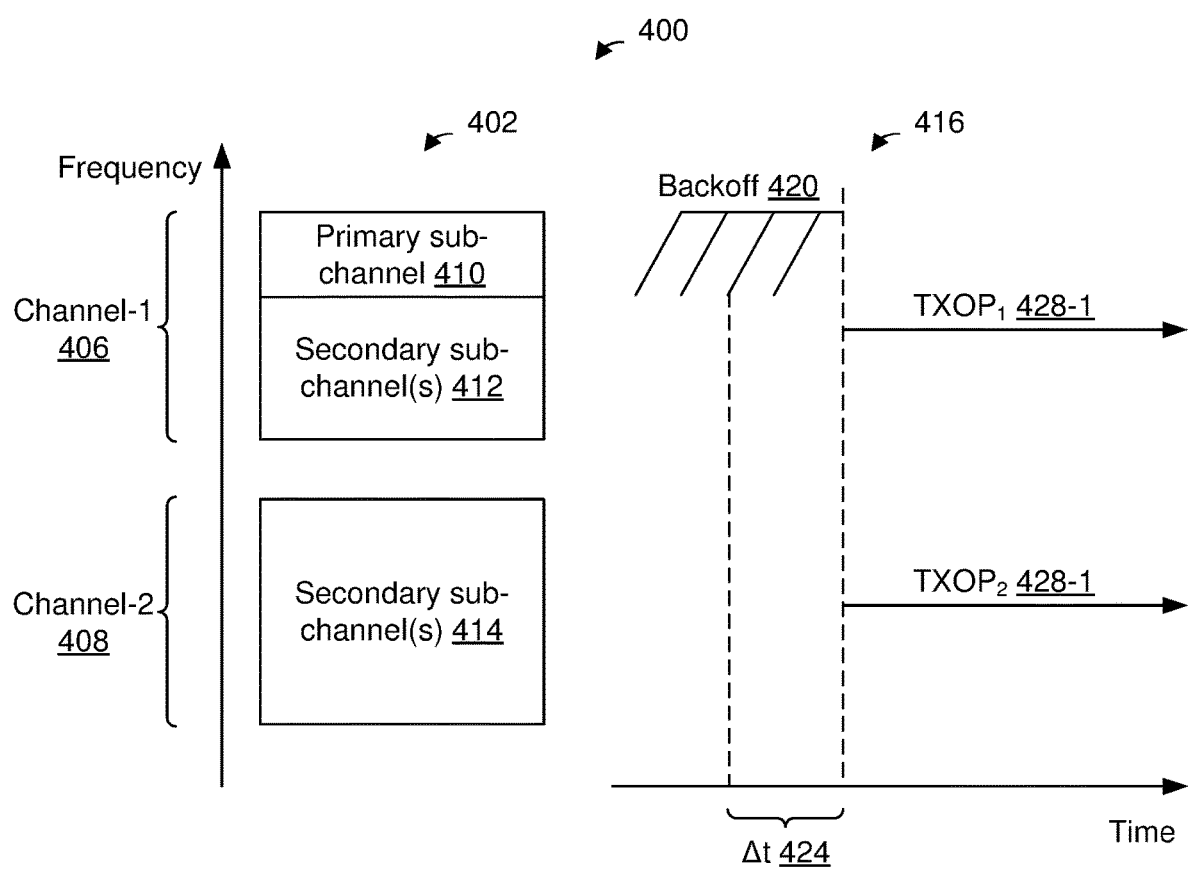
FIG. 4A is a diagram illustrating an example method for reserving multiple communication channels, according to an embodiment.

FIG. 4A is a diagram 400 illustrating an example method for reserving multiple communication channels, according to an embodiment. The method for reserving multiple communication channels illustrated in FIG. 4A is implemented by communication devices of FIG. 1, according to an embodiment, and FIG. 4A is described with reference to FIG. 1 for ease of explanation. However, the method for reserving multiple communication channels illustrated in FIG. 4A is implemented by other suitable communication devices in other embodiments.

In the scenario illustrated in FIG. 4A, a channelization scheme 402 includes a first channel (channel-1) 406 and a second channel (channel-2) 408. Channel 1 406 includes a primary sub-channel 410 and one or more secondary sub-channels 412. Channel 2 408 includes one or more secondary sub-channels and does not include a primary sub-channel. The channelization scheme 402 is similar to the channelization scheme described with reference to FIG. 3A. The channelization scheme 402 corresponds to an aggregation of channel-1 406 and channel-2 408 into an aggregate communication channel that comprises channel-1 406 and channel-2 408.

A communication device performs a procedure 416 for reserving channel-1 406 and channel-2 408. For example, the multi-band idle determination controller 144 performs the procedure 416, according to an embodiment. The procedure 416 includes beginning a backoff procedure 420 (such as described above) when the communication device determines that the primary sub-channel 410 is idle (e.g., using the CCA procedure described above), according to an embodiment. For example, the communication device begins (e.g., the multi-band idle determination controller 144 begins) the backoff procedure 420 after a packet transmission by another device ends or a previous TXOP ends and the CCA procedure described above indicates that the primary sub-channel 410 is idle.

Prior to initiating a transmission to reserve a TXOP in channel-1 406, and in connection with the backoff procedure 420, the communication device determines (e.g., the multi-band idle determination controller 144 determines) whether the one or more of the secondary sub-channels 412 were idle during a time period $\Delta t$ 424 immediately prior to a first transmission to reserve channel-1 406. Additionally, prior to initiating a transmission to reserve a TXOP in channel-2 408, and in connection with the backoff procedure 420, the communication device determines (e.g., the multi-band idle determination controller 144 begins) whether one or more of the secondary sub-channels 414 were idle during the time period $\Delta t$ 424 immediately prior to a second transmission to reserve channel-2 408. In an embodiment, the communication device determines whether the secondary sub-channels 412 and 414 were idle during the time period $\Delta t$ 424 by performing the physical CS operation described above in each of the secondary sub-channels 412 and 414. For example, the physical CS operation includes the multi-band idle determination controller 144 comparing energy levels in the secondary sub-channels 412 and 414 determined by the multi-band energy sensor 142 to one or more thresholds.

In an embodiment, the time duration $\Delta t$ 424 is equal to an interframe space (such as the point coordination function (PCF) interframe space (PIFS) as defined in the IEEE 802.11 Standard). In other embodiments, the time duration $\Delta t$ 424 is another suitable time period (such as the short interframe space (SIFS) as defined in the IEEE 802.11 Standard, or another suitable time period).

In response to the backoff counter reaching zero and the communication device determining that the secondary sub-channels 412 were idle during the time period $\Delta t$ 424, the communication device reserves channel-1 406 for a first time period (TXOP$_1$) 428-1. In an embodiment, reserving channel-1 406 for the first time period 428-1 includes transmitting a first packet in channel-1 406, where the first packet includes one or more frames (e.g., RTS frames, CTS-to-self frames, etc.) configured to reserve channel-1 406 for the first time period 428-1, e.g., the one or more frames include a duration indictor that indicates the first time period 428-1. In an embodiment, the multi-band reservation controller 146 controls the network interface device 122 to transmit the first packet.

In an embodiment, if any of the secondary sub-channels 412 were not idle during the time period $\Delta t$ 424, such busy secondary sub-channels 412 are not reserved. For example, the first packet for reserving channels described above is not transmitted in any of the secondary sub-channels 412 that were not idle during the time period $\Delta t$ 424.

In response to the backoff counter reaching zero and the communication device determining that the secondary sub-channels 414 were idle during the time period $\Delta t$ 424, the communication device reserves channel-2 408 for a second time period (TXOP$_2$) 428-2. In an embodiment, reserving channel-2 408 for the second time period 428-2 includes transmitting a second packet in channel-2 408, where the second packet includes one or more frames (e.g., RTS frames, CTS-to-self frames, etc.) configured to reserve channel-2 408 for the second time period 428-2, e.g., the one or more frames include a duration indictor that indicates the second time period 428-2. In an embodiment, the multi-band reservation controller 146 controls the network interface device 122 to transmit the second packet.

In an embodiment, if any of the secondary sub-channels 414 were not idle during the time period Δt 424, such busy secondary sub-channels 414 are not reserved. For example, the second packet for reserving channels described above is not transmitted in any of the secondary sub-channels 414 that were not idle during the time period Δt 424.

In an embodiment, if none of the secondary sub-channels 414 were idle during the time period Δt 424, the second packet for reserving channels described above is not transmitted in any of the secondary sub-channels 414.

In some embodiments, the first time period 428-1 is equal to the second time period 428-2. In other embodiments, the first time period 428-1 is different than the second time period 428-2.

Figure 4B:
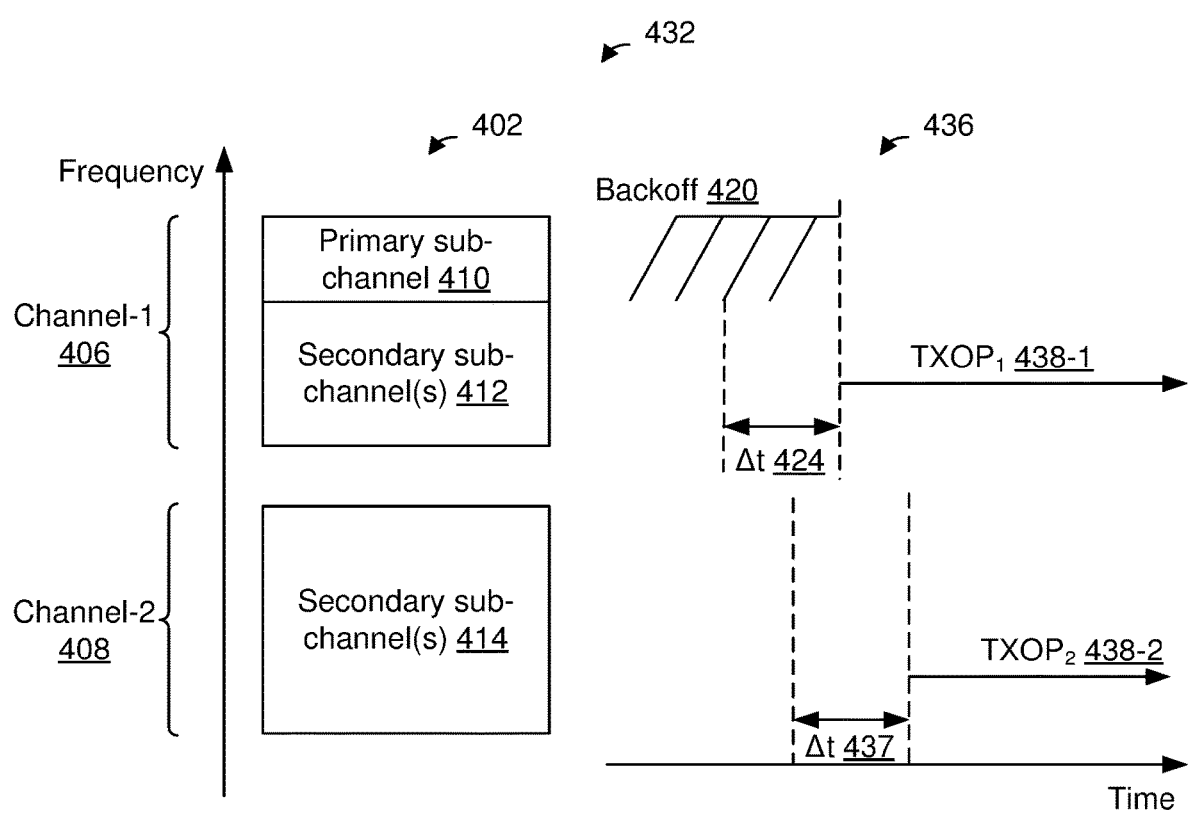
FIG. 4B is a diagram illustrating another example method for reserving multiple communication channels, according to another embodiment.

FIG. 4B is a diagram 432 illustrating another example method for reserving multiple communication channels, according to another embodiment. The method for reserving multiple communication channels illustrated in FIG. 4B is implemented by communication devices of FIG. 1, according to an embodiment, and FIG. 4B is described with reference to FIG. 1 for ease of explanation. However, the method for reserving multiple communication channels illustrated in FIG. 4B is implemented by other suitable communication devices in other embodiments.

In the scenario illustrated in FIG. 4B, the channelization scheme 402 of FIG. 4A is utilized, and like-numbered elements are not discussed in detail for reasons of brevity.

A communication device performs a procedure 436 for reserving channel-1 406 and channel-2 408 for respective time periods. For example, the multi-band idle determination controller 144 performs the procedure 436, according to an embodiment. The procedure 436 is similar to the procedure 416 of FIG. 4A, except that the respective time periods (e.g., TXOPs) established using the procedure 436 begin at different times.

The procedure 436 includes beginning the backoff procedure 420 (described above) when the communication device determines that the primary sub-channel 410 is idle (e.g., using the CCA procedure described above), according to an embodiment. For example, the communication device begins (e.g., the multi-band idle determination controller 144 begins) the backoff procedure 420 after a packet transmission by another device ends or a previous TXOP ends and the CCA procedure described above indicates that the primary sub-channel 410 is idle.

Prior to initiating a first transmission to reserve a TXOP in channel-1 406, and in connection with the backoff procedure 420, the communication device determines (e.g., the multi-band idle determination controller 144 determines) whether the one or more of the secondary sub-channels 412 were idle during the time period Δt 424 prior to the immediately prior to the first transmission to reserve channel-1 406.

In response to the backoff counter reaching zero and the communication device determining that the secondary sub-channels 412 were idle during the time period Δt 424, the communication device reserves channel-1 406 for a first time period (TXOP$_1$) 438-1. In an embodiment, reserving channel-1 406 for the first time period 438-1 includes transmitting a first packet in channel-1 406, where the first packet includes one or more frames (e.g., RTS frames, CTS-to-self frames, etc.) configured to reserve channel-1 406 for the first time period 438-1, e.g., the one or more frames include a duration indictor that indicates the first time period 438-1. In an embodiment, the multi-band reservation controller 146 controls the network interface device 122 to transmit the first packet.

In an embodiment, the communication device determines whether the secondary sub-channel(s) 412 were idle during a time period Δt 424 by performing the physical CS operation described above in each of the secondary sub-channel(s) 412. For example, the physical CS operation includes the multi-band idle determination controller 144 comparing energy levels in the secondary sub-channels 412 determined by the multi-band energy sensor 142 to one or more thresholds. In an embodiment, if any of the secondary sub-channels 412 were not idle during the time period Δt 424, such busy secondary sub-channels 412 are not reserved. For example, the first packet for reserving channels described above is not transmitted in any of the secondary sub-channels 412 that were not idle during the time period Δt 424.

Additionally, prior to initiating a second transmission to reserve a second time period in channel-2 408, and in connection with establishing the TXOP 438-1 in channel-1 406, the communication device determines (e.g., the multi-band idle determination controller 144 determines) whether each of the secondary sub-channel(s) 414 was idle during a time period Δt 437 prior to the second transmission to reserve the second time period in channel-2 408. In an embodiment, the time period Δt 437 has a same length as the time period Δt 424. In another embodiment, the time period Δt 437 has a different suitable length than the time period Δt 424.

In an embodiment, the communication device determines whether the secondary sub-channel(s) 414 were idle during the time period Δt 437 by performing the physical CS operation described above in each of the secondary sub-channels 414. For example, the physical CS operation includes the multi-band idle determination controller 144 comparing energy levels in the secondary sub-channels 412 determined by the multi-band energy sensor 142 to one or more thresholds.

In connection with establishing TXOP 438-1 and the communication device determining that the secondary sub-channel(s) 414 were idle during the time period Δt 437, the communication device reserves channel-2 408 for a second time period (TXOP$_2$) 438-2. In an embodiment, reserving channel-1 406 for the second time period 438-2 includes transmitting a second packet in channel-2 408, where the second packet includes one or more frames (e.g., RTS frames, CTS-to-self frames, etc.) configured to reserve channel-2 408 for the second time period 438-2, e.g., the one or more frames include a duration indictor that indicates the second time period 438-2. In an embodiment, the multi-band reservation controller 146 controls the network interface device 122 to transmit the second packet.

In an embodiment, if any of the secondary sub-channels 414 were not idle during the time period Δt 437, such busy secondary sub-channels 414 are not reserved. For example, the second packet for reserving channels described above is not transmitted in any of the secondary sub-channels 414 that were not idle during the time period Δt 437.

In an embodiment, if none of the secondary sub-channels 414 were idle during the time period Δt 437, the second packet for reserving channels described above is not transmitted in any of the secondary sub-channels 414.

In some embodiments, the first time period 438-1 ends at the same as the second time period 438-2. In other embodiments, the first time period 438-1 ends at a different time than the second time period 438-2.

Figure 4C:
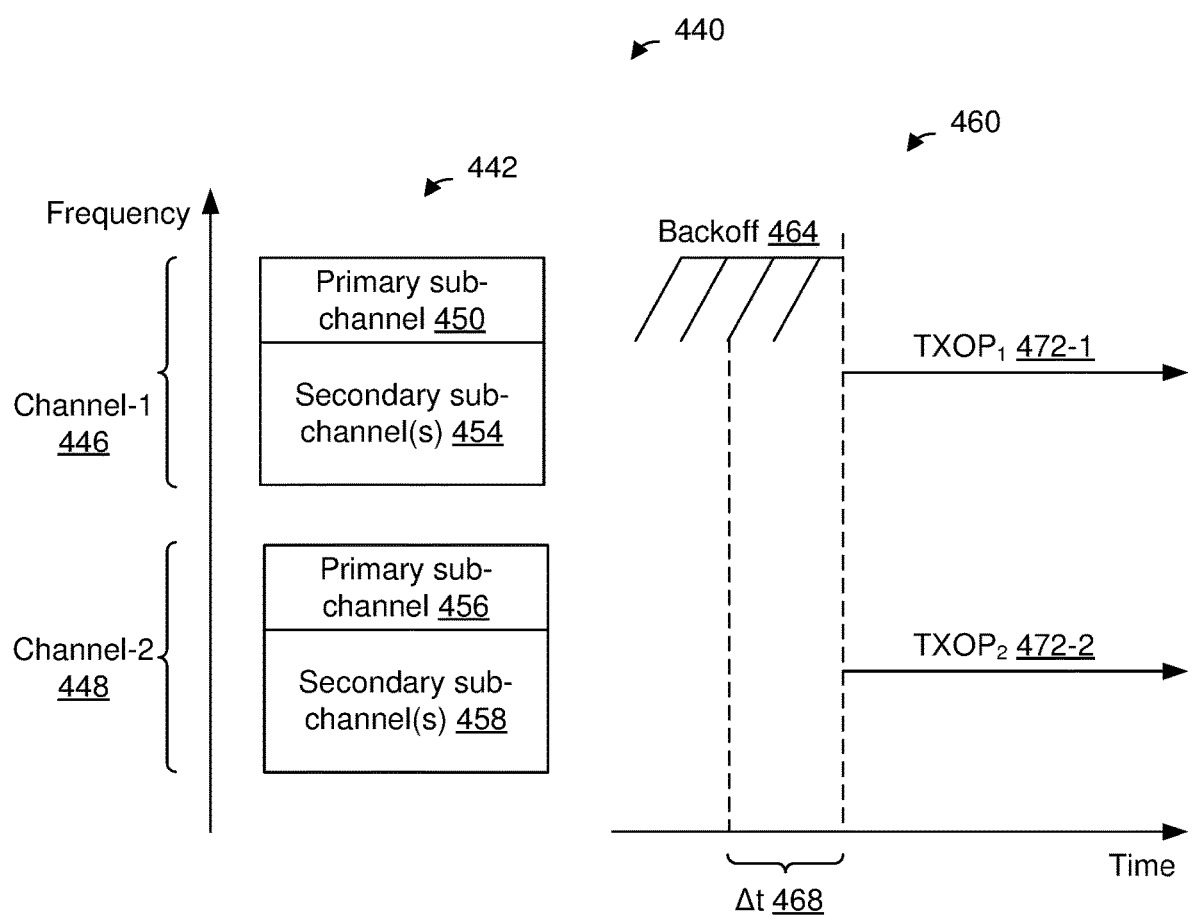
FIG. 4C is a diagram illustrating another example method for reserving multiple communication channels, according to another embodiment.

FIG. 4C is a diagram 440 illustrating another example method for reserving multiple communication channels, according to another embodiment. The method for reserving multiple communication channels illustrated in FIG. 4C is implemented by communication devices of FIG. 1, according to an embodiment, and FIG. 4C is described with reference to FIG. 1 for ease of explanation. However, the method for reserving multiple communication channels illustrated in FIG. 4C is implemented by other suitable communication devices in other embodiments.

In the scenario illustrated in FIG. 4C, a channelization scheme 442 includes a first channel (channel-1) 446 and a second channel (channel-2) 448. Channel 1 446 includes a primary sub-channel 450 and one or more secondary sub-channels 454. Channel 2 448 includes a primary sub-channel 456 and one or more secondary sub-channels 458. The channelization scheme 442 is similar to the channelization scheme described with reference to FIG. 3B.

The channelization scheme 442 corresponds to an aggregation of channel-1 446 and channel-2 448 into an aggregate communication channel that comprises channel-1 446 and channel-2 448.

A communication device performs a procedure 460 for reserving channel-1 446 and channel-2 448. In an embodiment, the communication device maintains (e.g., the multi-band idle determination controller 144 maintains) a first NAV counter corresponding to primary sub-channel 450 and a second NAV counter corresponding to primary sub-channel 456; and the procedure 460 involves using (e.g., the multi-band idle determination controller 144 using) the first NAV counter in connection with determining whether channel-1 446 is idle, and using the second NAV counter in connection with determining whether channel-2 448 is idle, as will be described in more detail below.

The procedure 460 includes beginning a backoff procedure 464 (such as described above) when the communication device determines that the primary sub-channel 450 is idle (e.g., using the CCA procedure described above), according to an embodiment. For example, the communication device begins (e.g., the multi-band idle determination controller 144 begins) the backoff procedure 464 after a packet transmission by another device ends or a previous TXOP ends and the CCA procedure described above indicates that the primary sub-channel 450 is idle. In an embodiment, determining whether the primary sub-channel 450 is idle includes determining (e.g., the multi-band idle determination controller 144 determining) whether the first NAV counter corresponding to primary sub-channel 450 is zero.

Prior to initiating a first transmission to reserve a TXOP in channel-1 446, and in connection with the backoff procedure 464, the communication device determines (e.g., the multi-band idle determination controller 144 determines) whether the one or more of the secondary sub-channels 454 were idle during a time period Δt 468 immediately prior to the first transmission to reserve channel-1 446. In an embodiment, the communication device determines whether the secondary sub-channel(s) 454 were idle during the time period Δt 468 by performing the physical CS operation described above in each of the secondary sub-channels 454. For example, the physical CS operation includes the multi-band idle determination controller 144 comparing energy levels in the secondary sub-channels 454 determined by the multi-band energy sensor 142 to one or more thresholds.

In an embodiment, the time duration Δt 468 is equal to PIFS as defined in the IEEE 802.11 Standard. In other embodiments, the time duration Δt 468 is another suitable time period (such as the SIFS as defined in the IEEE 802.11 Standard, or another suitable time period).

In response to the backoff counter reaching zero and the communication device determining that the secondary sub-channels 454 were idle during the time period Δt 468, the communication device reserves channel-1 446 for a first time period (TXOP$_1$) 472-1. In an embodiment, reserving channel-1 446 for the first time period 472-1 includes transmitting a first packet in channel-1 446, where the first packet includes one or more frames (e.g., RTS frames, CTS-to-self frames, etc.) configured to reserve channel-1 446 for the first time period 472-1, e.g., the one or more frames include a duration indictor that indicates the first time period 472-1. In an embodiment, the multi-band reservation controller 146 controls the network interface device 122 to transmit the first packet.

In an embodiment, if any of the secondary sub-channels 454 were not idle during the time period Δt 468, such busy secondary sub-channels 454 are not reserved. For example, the first packet for reserving channels described above is not transmitted in any of the secondary sub-channels 454 that were not idle during the time period Δt 468.

Additionally, prior to initiating a second transmission to reserve a TXOP in channel-2 448, and in connection with the backoff procedure 464, the communication device determines (e.g., the multi-band idle determination controller 144 determines) whether the primary sub-channel 456 is idle. In an embodiment, determining whether the primary sub-channel 456 is idle includes determining whether the second NAV counter corresponding to primary sub-channel 456 is zero. In an embodiment, if the primary sub-channel 456 is not idle (e.g., the second NAV counter corresponding to primary sub-channel 456 is non-zero), then channel-2 448 will not be reserved.

On the other hand, if the primary sub-channel 456 is determined to be idle, then the communication device determines (e.g., the multi-band idle determination controller 144 determines) whether one or more of the secondary sub-channels 458 were idle during the time period Δt 468. In an embodiment, the communication device determines whether the secondary sub-channel(s) 458 were idle during the time period Δt 468 by performing the physical CS operation described above in each of the secondary sub-channels 458. For example, the physical CS operation includes the multi-band idle determination controller 144 comparing energy levels in the secondary sub-channels 458 determined by the multi-band energy sensor 142 to one or more thresholds.

In response to the backoff counter reaching zero and the communication device determining that the primary sub-channel 456 and the secondary sub-channels 458 were idle during the time period Δt 468, the communication device reserves channel-2 448 for a second time period (TXOP$_2$) 472-2. In an embodiment, reserving channel-2 448 for the second time period 472-2 includes transmitting a second packet in channel-2 448, where the second packet includes one or more frames (e.g., RTS frames, CTS-to-self frames, etc.) configured to reserve channel-2 448 for the second time period 472-2, e.g., the one or more frames include a duration indictor that indicates the second time period 472-2. In an embodiment, the multi-band reservation controller 146 controls the network interface device 122 to transmit the second packet.

In an embodiment, if any of the secondary sub-channels 458 were not idle during the time period Δt 468, such busy secondary sub-channels 458 are not reserved. For example, the second packet for reserving channels described above is not transmitted in any of the secondary sub-channels 458 that were not idle during the time period Δt 468.

In an embodiment, if none of the secondary sub-channels 458 were idle during the time period Δt 468, the second packet for reserving channels described above is not transmitted in any of the secondary sub-channels 458.

In some embodiments, a duration of the first time period 472-1 is equal to a duration of the second time period 472-2. In other embodiments, the duration of the first time period 472-1 is different than the duration of the second time period 472-2.

Figure 4D:
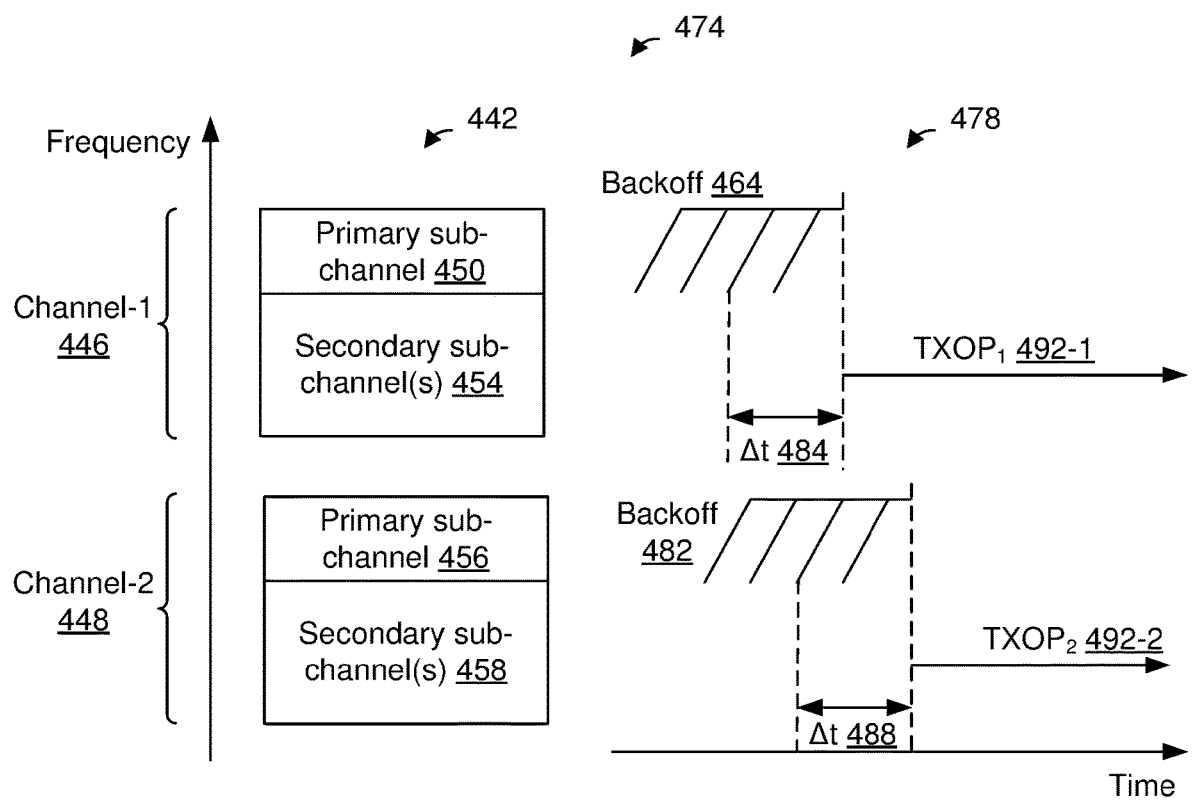
FIG. 4D is a diagram illustrating another example method for reserving multiple communication channels, according to another embodiment.

FIG. 4D is a diagram 474 illustrating another example method for reserving multiple communication channels, according to another embodiment. The method for reserving multiple communication channels illustrated in FIG. 4D is implemented by communication devices of FIG. 1, according to an embodiment, and FIG. 4D is described with reference to FIG. 1 for ease of explanation. However, the method for reserving multiple communication channels illustrated in FIG. 4D is implemented by other suitable communication devices in other embodiments.

In the scenario illustrated in FIG. 4D, the channelization scheme 442 of FIG. 4C is utilized, and like-numbered elements are not discussed in detail for reasons of brevity.

One or more communication devices perform a procedure 478 for reserving channel-1 446 and channel-2 448 for respective time periods. Unlike the procedure 460 of FIG. 4C, the respective time periods (e.g., TXOPs) established using the procedure 478 begin at different times. In an embodiment, the communication device maintains (e.g., the multi-band idle determination controller 144 maintains) a first NAV counter corresponding to primary sub-channel 450 and a second NAV counter corresponding to primary sub-channel 456; and the procedure 478 involves using (e.g., the multi-band idle determination controller 144 using) the first NAV counter in connection with determining whether channel-1 446 is idle, and using the second NAV counter in connection with determining whether channel-2 448 is idle, as will be described in more detail below. In an embodiment, the communication device maintains (e.g., the multi-band idle determination controller 144 maintains) a first backoff counter corresponding to primary sub-channel 450 and a second backoff counter corresponding to primary sub-channel 456; and the procedure 478 involves using the first backoff counter in connection with determining whether channel-1 446 is idle, and using the second backoff counter in connection with determining whether channel-2 448 is idle, as will be described in more detail below.

The procedure 478 includes beginning the backoff procedure 464 (described with reference to FIG. 4C, and using the first backoff counter) when the communication device determines that the primary sub-channel 450 is idle (e.g., using the CCA procedure described above), according to an embodiment. For example, the communication device begins (e.g., the multi-band idle determination controller 144 begins) the backoff procedure 464 after a packet transmission by another device ends or a previous TXOP ends and the CCA procedure described above indicates that the primary sub-channel 450 is idle. In an embodiment, determining whether the primary sub-channel 450 is idle includes determining whether the first NAV counter corresponding to primary sub-channel 450 is zero.

Prior to initiating a first transmission to reserve a TXOP in channel-1 446, and in connection with the backoff procedure 464, the communication device determines (e.g., the multi-band idle determination controller 144 determines) whether the one or more of the secondary sub-channels 454 were idle during a time period Δt 484 immediately prior to the first transmission to reserve channel-1 446. In an embodiment, the communication device determines whether the secondary sub-channel(s) 454 were idle during the time period Δt 484 by performing the physical CS operation described above in each of the secondary sub-channels 454. For example, the physical CS operation includes the multi-band idle determination controller 144 comparing energy levels in the secondary sub-channels 454 determined by the multi-band energy sensor 142 to one or more thresholds.

In an embodiment, the time duration Δt 484 is equal to PIFS as defined in the IEEE 802.11 Standard. In other embodiments, the time duration Δt 484 is another suitable time period (such as the SIFS as defined in the IEEE 802.11 Standard, or another suitable time period).

In response to the first backoff counter reaching zero and the communication device determining that the secondary sub-channels 454 were idle during the time period Δt 484, the communication device reserves channel-1 446 for a first time period (TXOP$_1$) 492-1. In an embodiment, reserving channel-1 446 for the first time period 492-1 includes transmitting a first packet in channel-1 446, where the first packet includes one or more frames (e.g., RTS frames, CTS-to-self frames, etc.) configured to reserve channel-1 446 for the first time period 492-1, e.g., the one or more frames include a duration indictor that indicates the first time period 492-1. In an embodiment, the multi-band reservation controller 146 controls the network interface device 122 to transmit the first packet.

In an embodiment, if any of the secondary sub-channels 454 were not idle during the time period Δt 484, such busy secondary sub-channels 454 are not reserved. For example, the first packet for reserving channels described above is not transmitted in any of the secondary sub-channels 454 that were not idle during the time period Δt 484.

Additionally, in connection with reserving channel-2 448, the communication device performs a backoff procedure 482 (using the second backoff counter) when the communication device determines that the primary sub-channel 456 is idle (e.g., using the CCA procedure described above), according to an embodiment. For example, the communication device begins (e.g., the multi-band idle determination controller 144 begins) the backoff procedure 482 after a packet transmission by another device ends or a previous TXOP ends and the CCA procedure described above indicates that the primary sub-channel 456 is idle. In an embodiment, determining whether the primary sub-channel 456 is idle includes determining whether the second NAV counter corresponding to primary sub-channel 456 is zero.

Prior to initiating a second transmission to reserve a TXOP in channel-2 448, and in connection with the backoff procedure 482, the communication device determines (e.g., the multi-band idle determination controller 144 determines) whether the one or more of the secondary sub-channels 458 were idle during a time period Δt 488 immediately prior to the second transmission to reserve channel-2 448. In an embodiment, the communication device determines whether the secondary sub-channel(s) 458 were idle during the time period Δt 488 by performing the physical CS operation described above in each of the secondary sub-channels 458.

For example, the physical CS operation includes the multi-band idle determination controller 144 comparing energy levels in the secondary sub-channels 458 determined by the multi-band energy sensor 142 to one or more thresholds.

In an embodiment, a duration of the time period $\Delta t$ 488 is equal to the duration of the time duration $\Delta t$ 484. In another embodiment, the time period $\Delta t$ 488 has a suitable duration that is different that the duration of the time duration $\Delta t$ 484.

In response to the second backoff counter reaching zero and the communication device determining that the secondary sub-channels 458 were idle during the time period $\Delta t$ 488, the communication device reserves channel-2 448 for a second time period (TXOP$_2$) 492-2. In an embodiment, reserving channel-2 448 for the first time period 492-2 includes transmitting a second packet in channel-2 448, where the second packet includes one or more frames (e.g., RTS frames, CTS-to-self frames, etc.) configured to reserve channel-2 448 for the second time period 492-2, e.g., the one or more frames include a duration indictor that indicates the second time period 492-2. In an embodiment, the multi-band reservation controller 146 controls the network interface device 122 to transmit the second packet.

In an embodiment, if any of the secondary sub-channels 458 were not idle during the time period $\Delta t$ 488, such busy secondary sub-channels 458 are not reserved. For example, the second packet for reserving channels described above is not transmitted in any of the secondary sub-channels 458 that were not idle during the time period $\Delta t$ 488.

In an embodiment, the backoff procedure 464 and the backoff procedure 484 are executed by different devices, e.g., the backoff procedure 464 is performed by the AP 114 and the backoff procedure 484 is performed by one or more client stations 154, or vice versa.

Figure 5:
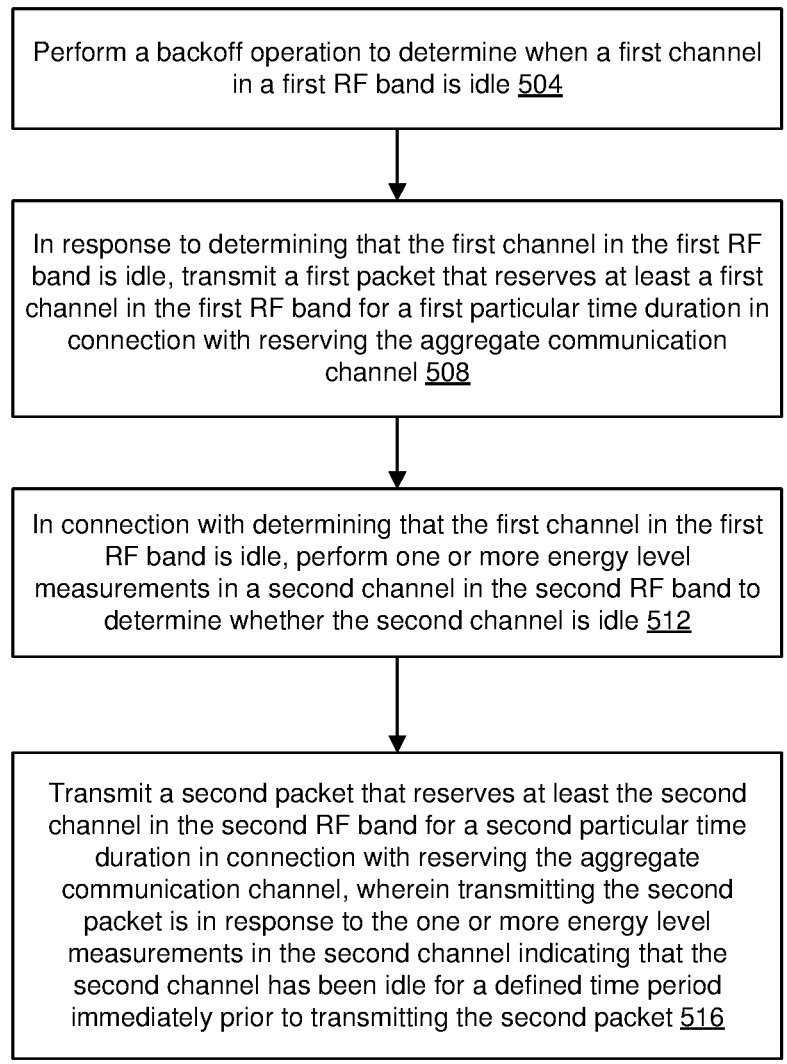
FIG. 5 is a flow diagram of an example method for reserving spectrum for respective time periods in respective radio frequency (RF) bands, according to an embodiment.

FIG. 5 is a flow diagram of an example method 500 for reserving spectrum for respective time periods in respective RF bands, according to an embodiment. In some embodiments, the AP 114 of FIG. 1 is configured to implement the method 500. The method 500 is described, however, in the context of the AP 114 merely for explanatory purposes and, in other embodiments, the method 500 is implemented by another suitable device such as the client station 154-1 or another suitable wireless communication device.

In some embodiments, the method 500 is utilized in the context of multi-RF band channelizations such as described above in reference to FIGS. 3A-B. In other embodiments, the method 500 is utilized in the context of other suitable multi-RF band channelizations, such as channelizations employing three or more RF bands. FIG. 5 is described with reference to FIGS. 4A-D for ease of explanation. However, the method 500 is not limited to the specific examples described with reference to FIGS. 4A-D. For example, the method 500 is utilized in the context of other suitable multi-RF band channelizations different than the multi-RF band channelizations of FIGS. 4A-D.

At block 504, a network interface device of a communication device performs (e.g., the MAC processor 126 performs, the multi-band idle determination controller 144 performs, etc.) a backoff procedure to determine when a first channel in a first RF band, among a plurality of RF bands, is idle in connection with reserving an aggregate communication channel for a frame exchange. In an embodiment, the aggregate communication channel includes a first frequency portion in the first RF band and a second frequency portion in a second RF band among the plurality of RF bands.

In an embodiment, the first channel in the first RF band comprises a primary sub-channel and one or more secondary sub-channels, and the backoff procedure is performed in connection with the primary sub-channel. In some embodiments in which the first channel in the first RF band comprises one or more secondary sub-channels, the network interface device determines (e.g., the MAC processor 126 determines, the multi-band idle determination controller 144 determines, etc.) whether the first channel is idle additionally based on energy level measurement(s) made (e.g., made by the multi-band energy sensor 142) in the one or more secondary sub-channels. For example, the network interface device performs (e.g., the MAC processor 126 performs, the multi-band idle determination controller 144 performs, etc.) a physical CS operation such as described above based on energy level measurement(s) made (e.g., made by the multi-band energy sensor 142) in the one or more secondary sub-channels. In an embodiment, physical CS operation includes determining whether each secondary sub-channel within the first channel has been idle for a defined time period immediately prior to transmitting a first packet to reserve the first channel in the first RF band.

At block 508, in response to determining, at block 504, that the first channel in the first RF band is idle, the communication device transmits (e.g., the network interface device 122 transmits) the first packet that reserves the first channel in the first RF band for a first particular time duration in connection with reserving the aggregate communication channel. For example, the MAC processor 126 controls (e.g., the multi-band channel reservation controller 146 controls) the network interface device 122 to transmit the first packet. In an embodiment, the first packet includes a control frame such as RTS frame, a CTS-to-self frame, etc., that includes a field (e.g., a duration field) that indicates the first particular time duration.

At block 512, in connection with determining, at block 504, that the first channel in the first RF band is idle, the communication device determines (e.g., the MAC processor 126 determines, the multi-band idle determination controller 144 determines, etc.) whether a second channel in the second RF band is idle based on energy level measurement(s) made (e.g., made by the multi-band energy sensor 142) in the second channel. For example, when the second channel comprises one or more sub-channels, the network interface device performs (e.g., the MAC processor 126 performs, the multi-band idle determination controller 144 performs, etc.) a physical CS operation such as described above based on energy level measurement(s) made (e.g., made by the multi-band energy sensor 142) in the one or more sub-channels. In an embodiment, block 512 includes determining whether each sub-channel within the second channel has been idle for a defined time period immediately prior to transmitting the second packet.

In an embodiment, the method 500 further comprises the communication device maintaining (e.g., the MAC processor 126 maintaining, the multi-band idle determination controller 144 maintaining): a first counter that indicates whether the first channel in the first RF band is currently reserved, and a second counter that indicates whether the second channel in the second RF band is currently reserved. For example, the first counter is a first NAV counter associated with a first primary sub-channel in the first channel, and the second counter is a second NAV counter associated with a second primary sub-channel in the first channel. In embodiments in which the communication device maintains a first counter that indicates whether the first channel in the first RF band is currently reserved, and a second counter that indicates whether the second channel in the second RF band is currently reserved: determining whether the first channel is idle is further based on the first counter, and determining whether the second channel is idle is further based on the second counter.

At block 516, in response to determining, at block 512, that the second channel in the second RF band is idle, the communication device transmits (e.g., the network interface device 122 transmits) a second packet that reserves the second channel in the second RF band for a second particular time duration in connection with reserving the aggregate communication channel. For example, the MAC processor 126 controls (e.g., the multi-band channel reservation controller 146 controls) the network interface device 122 to transmit the second packet. In an embodiment, the second packet includes a control frame such as RTS frame, a CTS-to-self frame, etc., that includes a field (e.g., a duration field) that indicates the first particular time duration.

In an embodiment, the first packet is transmitted (at block 508) at a first time, and the second packet is transmitted (at block 516) at a second time different than the first time.

In an embodiment, the first particular time duration for which the first channel is reserved is different that the second particular time duration for which the second channel is reserved.

In an embodiment, some WLAN legacy devices are configured to operate in the second RF band and cannot operate in the first RF band. For example, the first RF band corresponds to the 5 GHz band and the second RF band corresponds to the 2.4 GHz band.

In an embodiment, the first RF band is spaced apart from the second RF band by at least 1 GHz. For example, the 5 GHz band is spaced apart from the 2.4 GHz band by more than 1 GHz.

In an embodiment, the multi-channel communication system is utilized by an AP (e.g., the AP 114) to communicate with a plurality of client stations (e.g., the client stations 154). For instance, in various embodiments, the AP 114 transmits a trigger frame to the one or more client stations 154 to trigger an uplink (UL) transmission from the one or more of the client stations 154 to the AP 114. In other embodiments, the AP 114 transmits a downlink (DL) packet to the one or more client stations 154, which is then acknowledged in an UL transmission by the one or more client stations 154. In an embodiment, the UL transmission triggered by the AP 114 is an UL single user (SU) transmission from only one of the client stations 154. In another embodiment, the UL transmission is an UL multi-user (MU) transmission from a plurality of the client stations 154 using orthogonal frequency division multiple access (OFDMA) and/or MU-multiple input, multiple output (MU-MIMO) techniques. In an embodiment, the DL packet is a DL SU transmission to only one of the client stations 154. In another embodiment, the DL transmission is a DL MU transmission to a plurality of the client stations 154 using OFDMA and/or MU-MIMO techniques.

In various embodiments, the AP 114 indicates in a DL transmission to the one or more client stations 154 whether the one or more client stations 154 have to perform a CCA procedure prior to the one or more client stations 154 beginning an UL transmission that is responsive to the DL transmission. For instance, in an embodiment, the AP 114 indicates in a DL trigger frame to the one or more client stations 154 whether, prior to responding to the trigger frame, the one or more client stations 154 must perform a CCA procedure to determine whether a communication channel to be used for the UL transmission is idle. In various embodiments, the client stations 154 perform the CCA procedure during a suitable time period (e.g., SIFS as defined by the IEEE 802.11 Standard or another suitable time period) immediately prior beginning the UL transmission.

In some embodiments, the DL transmission from the AP 114 further indicates whether one or both of i) the physical CS operation and ii) the virtual CS operation are to be used at the one or more client stations 154 prior to beginning the UL transmission. In an embodiment, the respective client stations 154, responding to the DL transmission, perform the indicated CCA procedure in at least corresponding sub-channels that are to be used for the UL transmission by the respective client stations 154. In an embodiment, if the AP 114 does not indicate in the DL transmission that the one or more client stations 154 are to perform the CCA procedure prior to the UL transmission, the one or more client stations 154 do not perform the CCA procedure prior to the UL transmission.

In an embodiment corresponding to the channelization scheme as described with reference to FIG. 3A, when the AP 114 indicates that the client stations 154 must perform the CCA procedure prior to an UL transmission, the client stations 154 use the physical CS operation described above to determine whether corresponding sub-channel(s), to be used for corresponding UL transmissions, are busy or idle. In various embodiments, the client stations 154 perform the physical CS operation during a time period (e.g., SIFS as defined by the IEEE 802.11 Standard or another suitable time period) immediately prior to the beginning of the UL transmission.

In an embodiment corresponding to the channelization scheme as described with reference to FIG. 3B, when the AP 114 indicates that the client station(s) 154 must perform the CCA procedure prior to the UL transmission, each client station 154 uses both the virtual CS operation and the physical CS operation described above to determine whether corresponding sub-channel(s) are busy or idle. In various embodiments, the client stations 154 perform the virtual CS operation and the physical CS operation during a time period (e.g., an SIFS as defined by the IEEE 802.11 Standard or another suitable time period) prior to the beginning of the UL transmission.

Figure 6A:
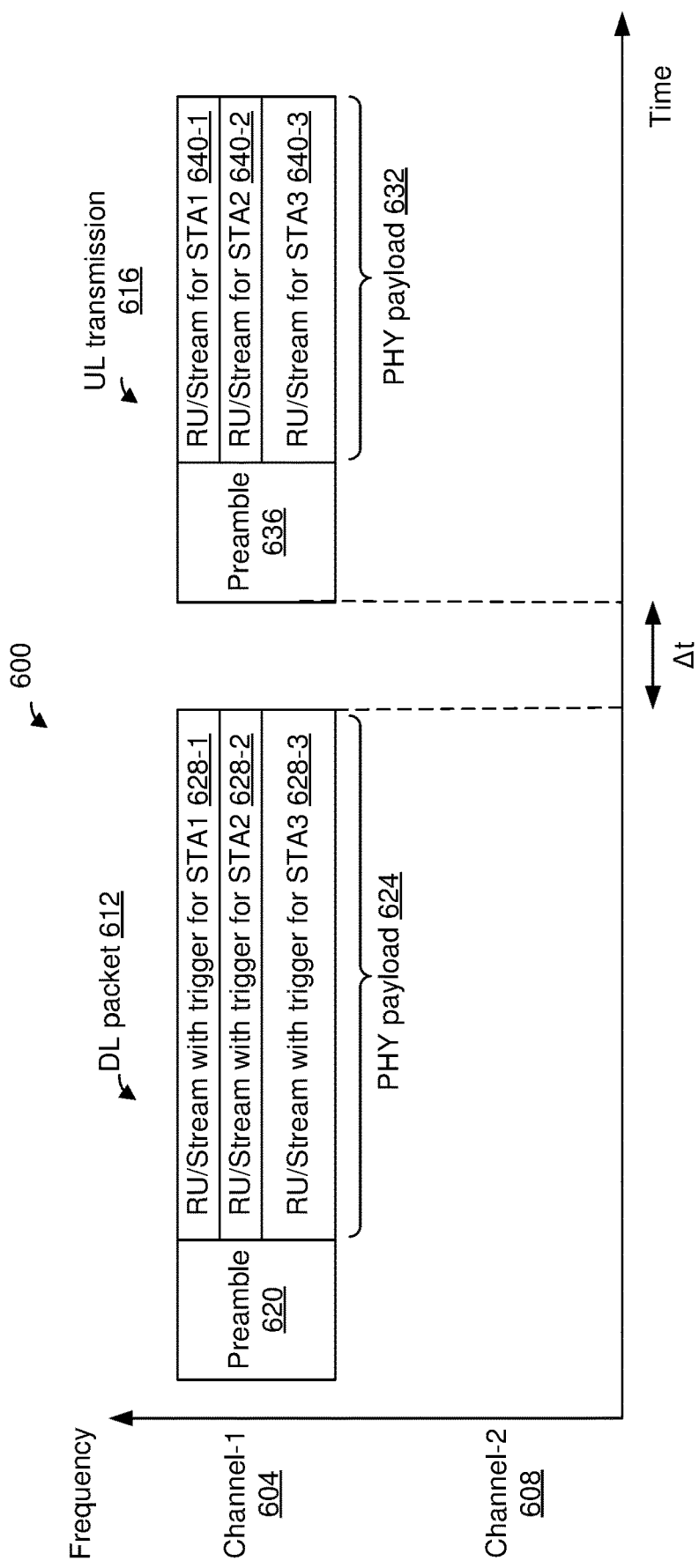
FIG. 6A is a diagram of an example packet exchange in a multi-band communication system, according to an embodiment.

FIG. 6A is a diagram of an example packet exchange 600 in a multi-band communication system, according to an embodiment. The packet exchange 600 is performed by communication devices of FIG. 1, according to an embodiment, and FIG. 6A is described with reference to FIG. 1 for ease of explanation. However, the packet exchange 600 illustrated in FIG. 6A is implemented by other suitable communication devices in other embodiments.

In some embodiments, the packet exchange 600 is in the context of the channelization schemes described above with respect to FIG. 3A or 3B. In other embodiments, the packet exchange 600 is in the context of other suitable channelization schemes.

The channelization scheme corresponding to the packet exchange 600 includes a first communication channel 604 (also referred to herein as "channel-1 604") aggregated with a second communication channel 608 (also referred to herein as "channel-2 608"). Channel-1 604 includes one or more component channels, and channel-2 608 includes one or more component channels. In an embodiment, channel-1 604 and channel-2 608 are within different RF bands. In another embodiment, channel-1 604 and channel-2 608 are within a same RF band. In some embodiments, channel-1 604 and channel-2 608 are adjacent in frequency (e.g., no gap in frequency exists between channel-1 604 and channel-2 608). In other embodiments, a relatively small gap in frequency exists between channel-1 604 and channel-2 608 with respect to the bandwidth of each component channel (e.g., if each component channel has a bandwidth of 20 MHz, the gap is less than 5 MHz, less than 2 MHz, less than 1 MHz, etc.). In other embodiments, a relatively large gap in frequency exists between channel-1 604 and channel-2 608 with respect to the bandwidth of each component channel (e.g., if each component channel has a bandwidth of 20 MHz, the gap is at least 20 MHz, at least 40 MHz, at least 100 MHz, at least 1 GHz, etc.).

The AP 114 transmits (e.g., the network interface 122 transmits) a DL packet 612 to a plurality of the client stations 154 over channel-1 604. In response to the DL packet 612, the plurality of client stations 154 transmit respective UL packets as part of an UL MU transmission 616 over channel-2 608.

The DL packet 612 corresponds to an OFDMA transmission to the plurality of client stations 154, according to an embodiment. The DL packet 612 corresponds to an MU-MIMO transmission to the plurality of client stations 154, according to another embodiment. The DL transmission 612 includes a PHY preamble 620 and a PHY payload 624. The PHY payload 624 includes respective data streams 628 corresponding to respective client stations 154. In an embodiment, the respective data streams 628 include respective A-MPDUs with respective trigger frames that solicit the UL MU transmission 616 from the plurality of client stations 154.

In an embodiment, the trigger frames include resource unit (RU) allocation information that indicate frequency allocations and/or spatial stream allocations, in channel-1 604, to be used by the client stations 154 when participating in the UL MU transmission 616. In an embodiment, the trigger frames include respective identifiers of the respective client stations 154 that are to participate in the UL MU transmission 616. In an embodiment, the trigger frames are to prompt acknowledgments from the respective client stations for data transmitted by the AP 114 to the respective client stations 154.

In an embodiment, the DL packet 612 indicates (e.g., the trigger frames indicate) to the one or more client stations 154 that the client stations 154 are to perform a CCA procedure prior to the client stations 154 beginning the UL transmission 616.

Following the DL transmission 612, after a time duration Δt, the client stations 154 begin transmitting as part of the UL MU transmission 616 in channel-1 604. In an embodiment, the time duration Δt is equal to a suitable time period (e.g., SIFS as defined by the IEEE 802.11 Standard or another suitable time period).

In an embodiment, if the trigger frames prompt acknowledgments, the UL transmission 616 includes acknowledgement frames from the respective client stations 154. In an embodiment, the UL transmission 616 only includes acknowledgement frames from the respective client stations, e.g., a PHY payload 632 of the UL transmission 616 only includes acknowledgment frames and does not include any data frames.

In an embodiment, the UL transmission 616 includes a PHY preamble portion 636 and the PHY payload portion 632. The PHY payload 632 includes respective data streams 640 transmitted by the respective client stations 154. In an embodiment, the respective data streams 640 are transmitted in respective allocated RUs as indicated in the trigger frames.

In an embodiment, in response to the DL packet 612 indicating (e.g., the trigger frames indicating) to the client stations 154 that the client stations 154 are to perform the CCA procedure prior to the client stations 154 beginning the UL transmission 616, each client station 154 use the CCA procedure to determining whether one or more sub-channels in which the client station 154 is to transmit are busy or idle. In an embodiment, the CCA procedure includes the physical CS operation described above.

Although FIG. 6A was described in the context of a plurality of client stations 154 participating in an UL MU transmission 616, in other embodiments the DL packet 612 includes one or more trigger frames that are configured to prompt only a single client station 154 to transmit an UL packet. In such embodiments, in response to the DL packet 612 indicating (e.g., the trigger frame(s) indicating) to the single client station 154 that the client station 154 is to perform the CCA procedure prior to the client station 154 transmitting the UL packet, the client station 154 uses the CCA procedure to determine whether one or more sub-channels in which the client station 154 is to transmit are busy or idle. In an embodiment, the CCA procedure includes the physical CS operation described above.

Figure 6B:
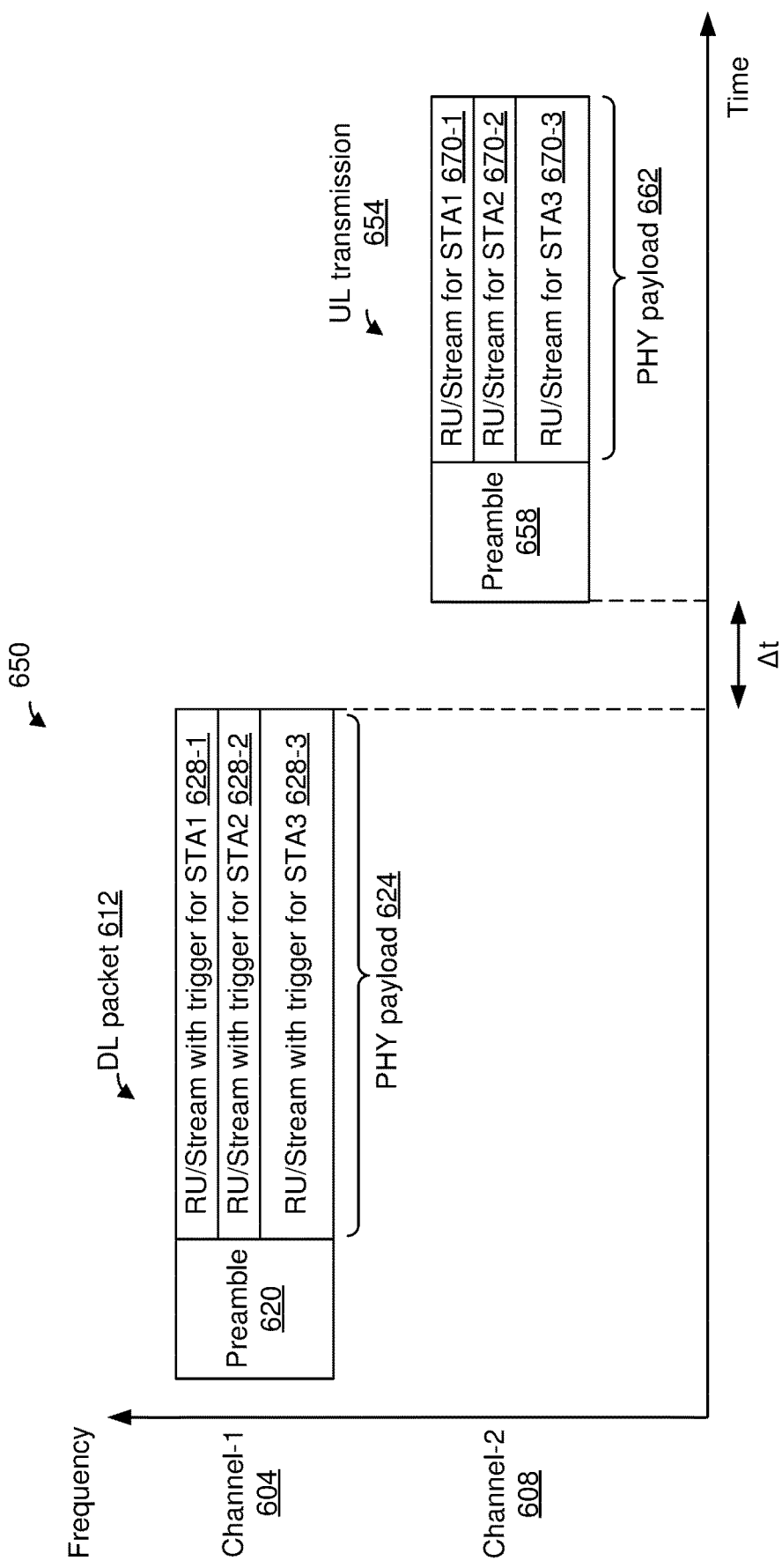
FIG. 6B is a diagram of another example packet exchange in a multi-band communication system, according to another embodiment.

FIG. 6B is a diagram of another example packet exchange 650 in a multi-band communication system, according to an embodiment. The packet exchange 650 is performed by communication devices of FIG. 1, according to an embodiment, and FIG. 6B is described with reference to FIG. 1 for ease of explanation. However, the packet exchange 650 illustrated in FIG. 6B is implemented by other suitable communication devices in other embodiments.

The packet exchange 650 is in the context of the same channelization scheme described above with respect to FIG. 6A.

In an embodiment corresponding to FIG. 6B, both the AP 114 and the plurality of client stations 154 are multi-band communication devices.

The AP 114 transmits (e.g., the network interface 122 transmits) the DL packet 612 to the plurality of the client stations 154 over channel-1 604. In response to the DL packet 612, the plurality of client stations 154 transmit an UL MU transmission 654 over channel-2 608.

In an embodiment, the trigger frames in the DL packet 612 include RU allocation information that indicate frequency allocations and/or spatial stream allocations, in channel-2 608, to be used by the client stations 154 when participating in the UL MU transmission 654.

In an embodiment, the DL packet 612 indicates (e.g., the trigger frames indicate) to the one or more client stations 154 that the client stations 154 are to perform a CCA procedure prior to the client stations 154 beginning the UL transmission 654.

Following the DL transmission 612, after a time duration Δt, the client stations 154 begin transmitting respective UL packets as part of the UL MU transmission 654 in channel-2 608. In an embodiment, the time duration Δt is equal to a suitable time period (e.g., SIFS as defined by the IEEE 802.11 Standard or another suitable time period).

In an embodiment, if the trigger frames prompt acknowledgments, the UL transmission 654 includes acknowledgement frames from the respective client stations 154. In an embodiment, the UL transmission 654 only includes acknowledgement frames from the respective client stations, e.g., a PHY payload 662 of the UL transmission 654 only includes acknowledgment frames and does not include any data frames.

In an embodiment, the UL transmission 654 includes a PHY preamble portion 658 and the PHY payload portion 662. The PHY payload 662 includes respective data streams 670 transmitted by the respective client stations 154. In an embodiment, the respective data streams 670 are transmitted in respective allocated RUs as indicated in the trigger frames.

In an embodiment, in response to the DL packet 612 indicating (e.g., the trigger frames indicating) to the client stations 154 that the client stations 154 are to perform the CCA procedure prior to the client stations 154 beginning the UL transmission 654, each client station 154 use the CCA procedure to determining whether one or more sub-channels in which the client station 154 is to transmit are busy or idle.

In an embodiment in which channel-1 604 includes a primary sub-channel and channel-2 608 does not include a primary sub-channel (similar to the channelization illustrated in FIG. 3A), the CCA procedure performed by each client station 154 includes, prior to initiating the UL transmission 654, the client station 154 determines (e.g., the multi-band idle determination controller 184 determines) whether one or more of sub-channels in which the client station 154 is to transmit were idle during the time period Δt. In an embodiment, the client station 154 determines whether the secondary sub-channel(s) were idle during the time period Δt by performing the physical CS operation described above in each of the sub-channels. For example, the physical CS operation includes the multi-band idle determination controller 184 comparing energy levels in the sub-channels determined by the multi-band energy sensor 182 to one or more thresholds.

In response to the client station 154 determining (e.g., the multi-band idle determination controller 184 determining) that the one or more sub-channels were idle during the time period Δt, the client station 154 begins (e.g., the network interface device 162 begins) transmitting as part of the UL MU transmission 654. In an embodiment, the MAC processor 166 controls the network interface device 162 to transmit as part of the UL MU transmission 654.

In an embodiment, if any of the sub-channels in which the client station 154 is to transmit as part of the UL MU transmission 654 were not idle during the time period Δt, the client station 154 does not transmit (e.g., the network interface device 162 does not transmit) in such busy sub-channels.

In an embodiment, if none of the sub-channels in which the client station 154 is to transmit as part of the UL MU transmission 654 were idle during the time period Δt, the client station 154 does not participate in the UL MU transmission 654.

In an embodiment in which channel-1 604 includes a first primary sub-channel and channel-2 608 includes a second primary sub-channel (similar to the channelization illustrated in FIG. 3B), the CCA procedure performed by each client station 154 includes, prior to initiating the UL transmission 654, the network interface device 162 performs (e.g., the multi-band idle determination controller 184 performs) a virtual CS operation to determine whether channel-2 608 is idle. For example, the network interface device 162 determines (e.g., the multi-band idle determination controller 184 determines) whether a NAV counter corresponding to the second primary sub-channel indicates the channel-2 608 is idle.

In an embodiment, if the virtual CS operation indicates that channel-2 608 is busy, the client station 154 does not participate in the UL MU transmission 654.

On the other hand, if the virtual CS operation indicates that channel-2 608 is idle, the network interface device 162 determines (e.g., the multi-band idle determination controller 184 determines) whether one or more secondary sub-channels in channel-2 608 in which the client station 154 is to transmit were idle during the time period Δt. In an embodiment, the client station 154 determines whether the secondary sub-channel(s) were idle during the time period Δt by performing the physical CS operation described above in each of the sub-channels. For example, the physical CS operation includes the multi-band idle determination controller 184 comparing energy levels in the sub-channels determined by the multi-band energy sensor 182 to one or more thresholds.

In response to the client station 154 determining (e.g., the multi-band idle determination controller 184 determining) that the one or more secondary sub-channels were idle during the time period Δt, the client station 154 begins (e.g., the network interface device 162 begins) transmitting as part of the UL MU transmission 654. In an embodiment, the MAC processor 166 controls the network interface device 162 to transmit as part of the UL MU transmission 654.

In an embodiment, if any of the secondary sub-channels in which the client station 154 is to transmit as part of the UL MU transmission 654 were not idle during the time period Δt, the client station 154 does not transmit (e.g., the network interface device 162 does not transmit) in such busy secondary sub-channels.

In an embodiment, if none of the sub-channels in which the client station 154 is to transmit as part of the UL MU transmission 654 were idle during the time period Δt, the client station 154 does not participate in the UL MU transmission 654.

Although FIG. 6B was described in the context of a plurality of client stations 154 participating in an UL MU transmission 654, in other embodiments the DL packet 612 includes one or more trigger frames that are configured to prompt only a single client station 154 to transmit an UL packet. In such embodiments, in response to the DL packet 612 indicating (e.g., the trigger frame(s) indicating) to the single client station 154 that the client station 154 is to perform the CCA procedure prior to the client station 154 transmitting the UL packet, the client station 154 uses the CCA procedure to determine whether one or more sub-channels in which the client station 154 is to transmit are busy or idle.

Figure 7A:
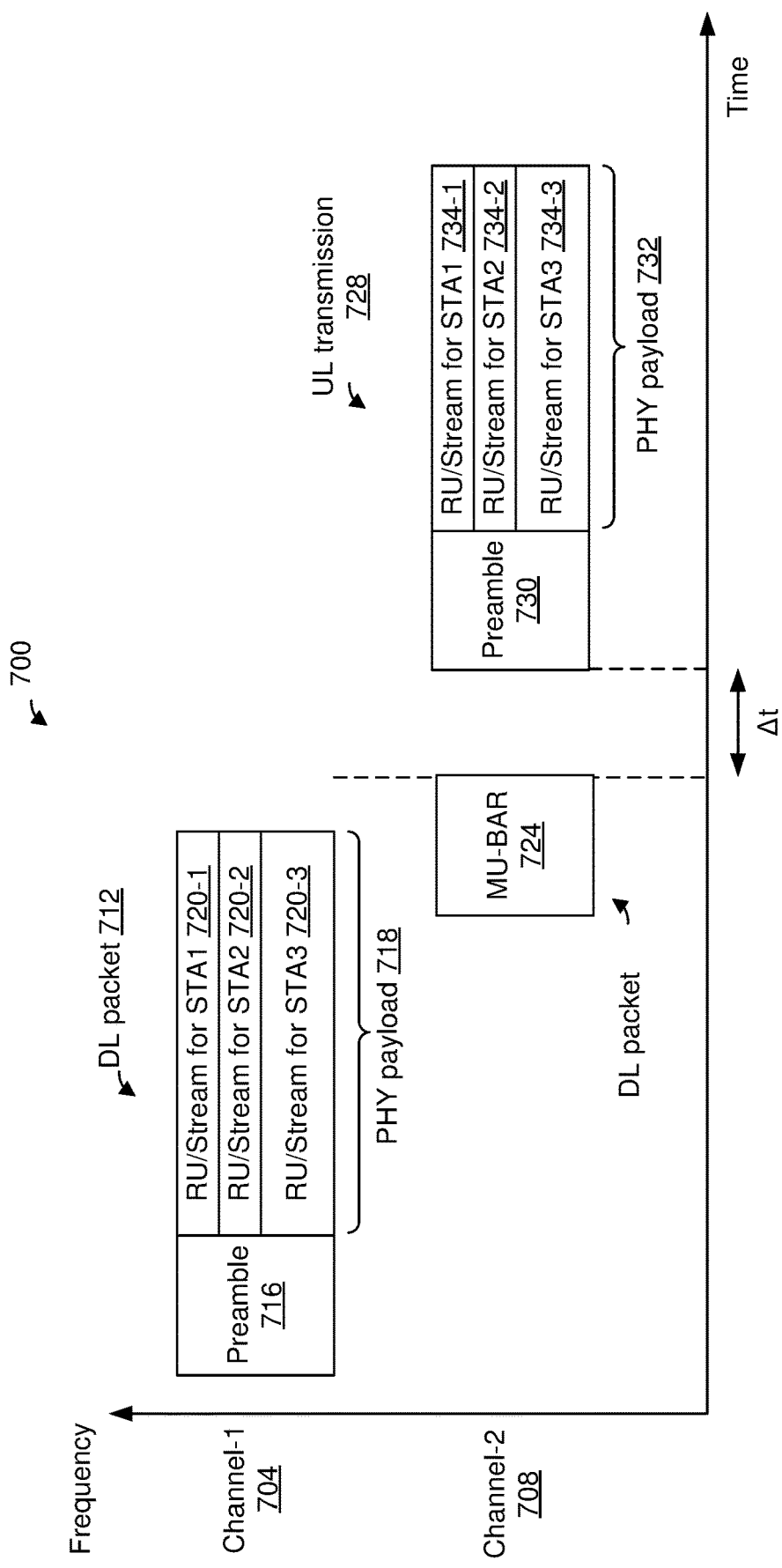
FIG. 7A is a diagram of another example packet exchange in a multi-band communication system, according to another embodiment.

FIG. 7A is a diagram of another example packet exchange 700 in a multi-band communication system, according to an embodiment. The packet exchange 700 is performed by communication devices of FIG. 1, according to an embodiment, and FIG. 7A is described with reference to FIG. 1 for ease of explanation. However, the packet exchange 700 illustrated in FIG. 7A is implemented by other suitable communication devices in other embodiments.

In some embodiments, the packet exchange 700 is in the context of the channelization schemes described above with respect to FIG. 3A or 3B. In other embodiments, the packet exchange 700 is in the context of other suitable channelization schemes.

The channelization scheme corresponding to the packet exchange 700 includes a first communication channel 704 (also referred to herein as "channel-1 704") aggregated with a second communication channel 708 (also referred to herein as "channel-2 708"). Channel-1 704 includes one or more component channels, and channel-2 708 includes one or more component channels. In an embodiment, channel-1 704 and channel-2 708 are within different RF bands. In another embodiment, channel-1 704 and channel-2 708 are within a same RF band. In some embodiments, channel-1 704 and channel-2 708 are adjacent in frequency (e.g., no gap in frequency exists between channel-1 704 and channel-2 708). In other embodiments, a relatively small gap in frequency exists between channel-1 704 and channel-2 708 with respect to the bandwidth of each component channel (e.g., if each component channel has a bandwidth of 20 MHz, the gap is less than 5 MHz, less than 2 MHz, less than 1 MHz, etc.). In other embodiments, a relatively large gap in frequency exists between channel-1 704 and channel-2 708 with respect to the bandwidth of each component channel (e.g., if each component channel has a bandwidth of 20 MHz, the gap is at least 20 MHz, at least 40 MHz, at least 100 MHz, at least 1 GHz, etc.).

In an embodiment corresponding to FIG. 7A, both the AP 114 and the plurality of client stations 154 are multi-band communication devices.

The AP 114 transmits (e.g., the network interface 122 transmits) a DL packet 712 to a plurality of the client stations 154 over channel-1 704. The DL packet 712 corresponds to an MU-MIMO transmission to the plurality of client stations 154, according to another embodiment. The DL packet 712 includes a PHY preamble 716 and a PHY payload 718. The PHY payload 718 includes respective data streams 720 corresponding to respective client stations 154. In an embodiment, the respective data streams 720 include respective A-MPDUs, each having multiple MPDUs.

Concurrently with transmitting the DL packet 712 over channel-1 704, the AP 114 transmits (e.g., the network interface 122 transmits) another DL packet 724 to a plurality of the client stations 154 over channel-2 708. The DL packet 724 includes one or more frames (such as an MU-BlockAck request (MU-BAR) frame or another suitable trigger frame) configured to trigger the plurality of client stations 154 to transmit respective UL packets as part of an UL MU transmission 728 that includes acknowledgment information for the MPDUs in the multiple data streams 720 of the DL packet 712.

In an embodiment, the trigger frame(s) in the DL packet 724 include RU allocation information that indicate frequency allocations and/or spatial stream allocations, in channel-2 708, to be used by the client stations 154 when participating in the UL MU transmission 728.

In an embodiment, the DL packet 724 indicates (e.g., the trigger frames indicate) to the one or more client stations 154 that the client stations 154 are to perform a CCA procedure prior to the client stations 154 beginning the UL MU transmission 728.

Following reception of the DL packet 724, after a time duration Δt, the client stations 154 begin transmitting UL packets as part of the UL MU transmission 728 in channel-2 708. In an embodiment, the time duration Δt is equal to a suitable time period (e.g., SIFS as defined by the IEEE 802.11 Standard or another suitable time period).

In an embodiment, the UL MU transmission 728 includes a PHY preamble portion 730 and a PHY payload portion 732. The PHY payload 732 includes respective data streams 734 transmitted by the respective client stations 154. In an embodiment, the respective data streams 734 are transmitted in respective allocated RUs as indicated in the trigger frames of the DL packet 724. In an embodiment, the respective data streams 734 include acknowledgement frames (e.g., block acknowledgment (BA) frames, ACK frames, etc.) from the respective client stations 154. In an embodiment, the respective data streams 734 only include acknowledgement frames from the respective client stations 154, e.g., the respective data streams 734 do not include any data frames.

In an embodiment, in response to the DL packet 724 indicating (e.g., the trigger frame(s) indicating) to the client stations 154 that the client stations 154 are to perform the CCA procedure prior to the client stations 154 beginning the UL transmission 728, each client station 154 use the CCA procedure to determining whether one or more sub-channels in which the client station 154 is to transmit are busy or idle.

In an embodiment in which channel-1 704 includes a primary sub-channel and channel-2 708 does not include a primary sub-channel (similar to the channelization illustrated in FIG. 3A), the CCA procedure performed by each client station 154 includes, prior to initiating the UL transmission 728, the client station 154 determines (e.g., the multi-band idle determination controller 184 determines) whether one or more of sub-channels in which the client station 154 is to transmit were idle during the time period Δt. In an embodiment, the client station 154 determines whether the secondary sub-channel(s) were idle during the time period Δt by performing the physical CS operation described above in each of the sub-channels. For example, the physical CS operation includes the multi-band idle determination controller 184 comparing energy levels in the sub-channels determined by the multi-band energy sensor 182 to one or more thresholds.

In response to the client station 154 determining (e.g., the multi-band idle determination controller 184 determining) that the one or more sub-channels were idle during the time period Δt, the client station 154 begins (e.g., the network interface device 162 begins) transmitting as part of the UL MU transmission 728. In an embodiment, the MAC processor 166 controls the network interface device 162 to transmit as part of the UL MU transmission 728.

In an embodiment, if any of the sub-channels in which the client station 154 is to transmit as part of the UL MU transmission 728 were not idle during the time period Δt, the client station 154 does not transmit (e.g., the network interface device 162 does not transmit) in such busy sub-channels.

In an embodiment, if none of the sub-channels in which the client station 154 is to transmit as part of the UL MU transmission 728 were idle during the time period Δt, the client station 154 does not participate in the UL MU transmission 728.

In an embodiment in which channel-1 704 includes a first primary sub-channel and channel-2 708 includes a second primary sub-channel (similar to the channelization illustrated in FIG. 3B), the CCA procedure performed by each client station 154 includes, prior to initiating the UL transmission 728, the network interface device 162 performs (e.g., the multi-band idle determination controller 184 performs) a virtual CS operation to determine whether channel-2 708 is idle. For example, the network interface device 162 determines (e.g., the multi-band idle determination controller 184 determines) whether a NAV counter corresponding to the second primary sub-channel indicates the channel-2 708 is idle.

In an embodiment, if the virtual CS operation indicates that channel-2 708 is busy, the client station 154 does not participate in the UL MU transmission 728.

On the other hand, if the virtual CS operation indicates that channel-2 708 is idle, the network interface device 162 determines (e.g., the multi-band idle determination controller 184 determines) whether one or more secondary sub-channels in channel-2 708 in which the client station 154 is to transmit were idle during the time period Δt. In an embodiment, the client station 154 determines whether the secondary sub-channel(s) were idle during the time period Δt by performing the physical CS operation described above in each of the sub-channels. For example, the physical CS operation includes the multi-band idle determination controller 184 comparing energy levels in the sub-channels determined by the multi-band energy sensor 182 to one or more thresholds.

In response to the client station 154 determining (e.g., the multi-band idle determination controller 184 determining) that the one or more secondary sub-channels were idle during the time period Δt, the client station 154 begins (e.g., the network interface device 162 begins) transmitting as part of the UL MU transmission 728. In an embodiment, the MAC processor 166 controls the network interface device 162 to transmit as part of the UL MU transmission 728.

In an embodiment, if any of the secondary sub-channels in which the client station 154 is to transmit as part of the UL MU transmission 728 were not idle during the time period Δt, the client station 154 does not transmit (e.g., the network interface device 162 does not transmit) in such busy secondary sub-channels.

In an embodiment, if none of the sub-channels in which the client station 154 is to transmit as part of the UL MU transmission 728 were idle during the time period Δt, the client station 154 does not participate in the UL MU transmission 728.

Figure 7B:
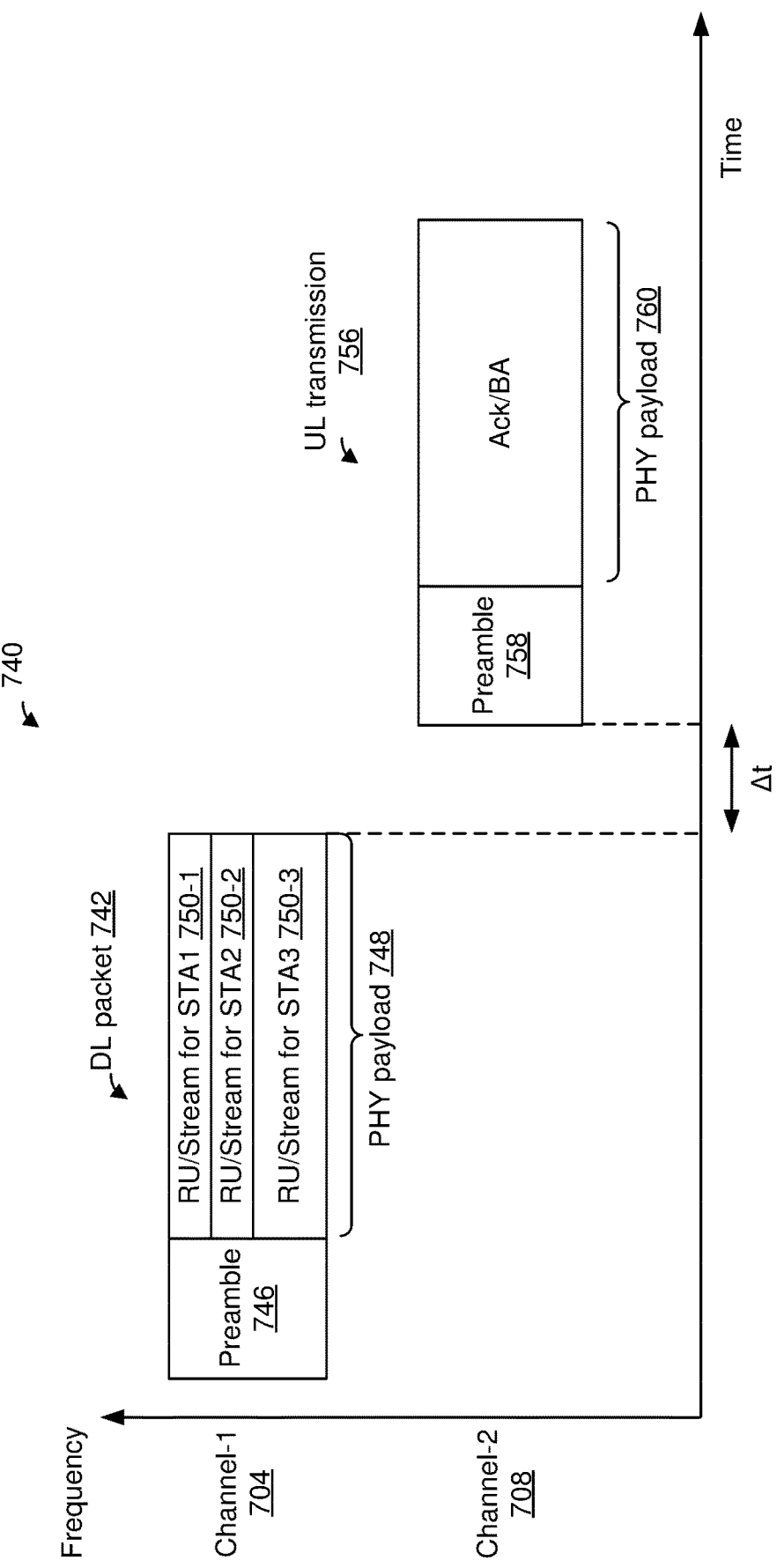
FIG. 7B is a diagram of another example packet exchange in a multi-band communication system, according to another embodiment.

FIG. 7B is a diagram of another example packet exchange 740 in a multi-band communication system, according to an embodiment. The packet exchange 740 is performed by communication devices of FIG. 1, according to an embodiment, and FIG. 7B is described with reference to FIG. 1 for ease of explanation. However, the packet exchange 740 illustrated in FIG. 7B is implemented by other suitable communication devices in other embodiments.

In some embodiments, the packet exchange 740 is in the context of the channelization schemes described above with respect to FIG. 3A or 3B. In other embodiments, the packet exchange 740 is in the context of other suitable channelization schemes.

The channelization scheme is the same as the channelization scheme described with reference to FIG. 7A.

In an embodiment corresponding to FIG. 7B, both the AP 114 and the plurality of client stations 154 are multi-band communication devices.

The AP 114 transmits (e.g., the network interface 122 transmits) a DL packet 742 to a plurality of the client stations 154 over channel-1 704. The DL packet 742 corresponds to an MU-MIMO transmission to the plurality of client stations 154, according to another embodiment. The DL packet 742 includes a PHY preamble 746 and a PHY payload 748. The PHY payload 748 includes respective data streams 750 corresponding to respective client stations 154. In an embodiment, the respective data streams 750 include respective sets of one or more MPDUs (e.g., each data stream includes an MPDU or an A-MPDU).

In an embodiment, one of the data streams 750 includes acknowledgment policy information that indicates that one of the client stations 154 (e.g., client station 154-1) is to transmit an acknowledgment immediately following an end of transmission of the DL packet 742. For example, the acknowledgment policy information indicates that the client station 154-1 is to begin transmitting the acknowledgment within a defined time period (e.g., SIFS as defined by the IEEE 802.11 Standard or another suitable time period) following an end of transmission of the DL packet 742. In an embodiment, the other data streams 750 include acknowledgment policy information that indicates that the other client stations 154 are not to transmit an acknowledgment immediately following an end of transmission of the DL packet 742. Rather, the other data streams 750 include acknowledgment policy information that indicates that the other client stations 154 are to transmit an acknowledgment only in response to a subsequent DL packet from the AP 114 that prompts the other client stations 154 to transmit acknowledgment information.

Following the DL transmission 742 and in response to the acknowledgment policy information that indicates that the client station 154-1 is to transmit an acknowledgment immediately following an end of transmission of the DL packet 742, after a time duration Δt, the client station 154-1 begins transmitting an UL single user (SU) packet 756 in channel-2 708. In an embodiment, the time duration Δt is equal to a suitable time period (e.g., SIFS as defined by the IEEE 802.11 Standard or another suitable time period).

In an embodiment, the UL SU packet 756 includes a PHY preamble portion 758 and a PHY payload portion 760. The PHY payload 760 includes acknowledgment information (e.g., a BA frames, an ACK frame, etc.) corresponding to one of the data streams 750 in the DL packet 742.

In an embodiment in which channel-2 708 includes a primary sub-channel, the client station 154-1 transmits (e.g., the network interface device 162 transmits) the UL SU packet 756 in a bandwidth that includes at least the primary sub-channel and optionally one or more secondary sub-channels. In another embodiment in which channel-2 708 does not include a primary sub-channel, the client station 154-1 transmits (e.g., the network interface device 162 transmits) the UL SU packet 756 in a bandwidth that spans a channel-2 708 as previously established by the AP 114.

In an embodiment, the client station 154-1 use a CCA procedure to determine whether one or more sub-channels in which the client station 154 is to transmit are busy or idle.

In an embodiment in which channel-1 704 includes a primary sub-channel and channel-2 708 does not include a primary sub-channel (similar to the channelization illustrated in FIG. 3A), the CCA procedure performed by the client station 154-1 includes, prior to initiating transmission of the UL SU packet 756, the client station 154 determines (e.g., the multi-band idle determination controller 184 determines) whether one or more of sub-channels in which the client station 154 is to transmit were idle during the time period Δt. In an embodiment, the client station 154-1 determines whether the secondary sub-channel(s) were idle during the time period Δt by performing the physical CS operation described above in each of the sub-channels. For example, the physical CS operation includes the multi-band idle determination controller 184 comparing energy levels in the sub-channels determined by the multi-band energy sensor 182 to one or more thresholds.

In response to the client station 154-1 determining (e.g., the multi-band idle determination controller 184 determining) that the one or more sub-channels were idle during the time period Δt, the client station 154 begins (e.g., the network interface device 162 begins) transmitting the UL SU packet 756. In an embodiment, the MAC processor 166 controls the network interface device 162 to transmit the UL SU packet 756.

In an embodiment, if any of the sub-channels in which the client station 154 is to transmit the UL SU packet 756 were not idle during the time period Δt, the client station 154 does not transmit (e.g., the network interface device 162 does not transmit) in such busy sub-channels.

In an embodiment, if none of the sub-channels in which the client station 154 is to transmit the UL SU packet 756 were idle during the time period Δt, the client station 154 does not transmit the UL SU packet 756.

In an embodiment in which channel-1 704 includes a first primary sub-channel and channel-2 708 includes a second primary sub-channel (similar to the channelization illustrated in FIG. 3B), the CCA procedure performed by the client station 154-1 includes, prior to initiating transmission of the UL SU packet 756, the network interface device 162 performs (e.g., the multi-band idle determination controller 184 performs) a virtual CS operation to determine whether channel-2 708 is idle. For example, the network interface device 162 determines (e.g., the multi-band idle determination controller 184 determines) whether a NAV counter corresponding to the second primary sub-channel indicates the channel-2 708 is idle.

In an embodiment, if the virtual CS operation indicates that channel-2 708 is busy, the client station 154 does not transmit the UL SU packet 756.

On the other hand, if the virtual CS operation indicates that channel-2 708 is idle, the network interface device 162 determines (e.g., the multi-band idle determination controller 184 determines) whether one or more secondary sub-channels in channel-2 708 in which the client station 154 is to transmit were idle during the time period Δt. In an embodiment, the client station 154 determines whether the secondary sub-channel(s) were idle during the time period Δt by performing the physical CS operation described above in each of the sub-channels. For example, the physical CS operation includes the multi-band idle determination controller 184 comparing energy levels in the sub-channels determined by the multi-band energy sensor 182 to one or more thresholds.

In response to the client station 154-1 determining (e.g., the multi-band idle determination controller 184 determining) that the one or more secondary sub-channels were idle during the time period Δt, the client station 154-1 begins (e.g., the network interface device 162 begins) transmitting the UL SU packet 756. In an embodiment, the MAC processor 166 controls the network interface device 162 to transmit the UL SU packet 756.

In an embodiment, if any of the secondary sub-channels in which the client station 154 is to transmit the UL SU transmission 756 were not idle during the time period Δt, the client station 154 does not transmit (e.g., the network interface device 162 does not transmit) in such busy secondary sub-channels.

In an embodiment, if none of the sub-channels in which the client station 154 is to transmit the UL SU packet 756 were idle during the time period Δt, the client station 154 does not transmit the UL SU packet 756.

Figure 7C:
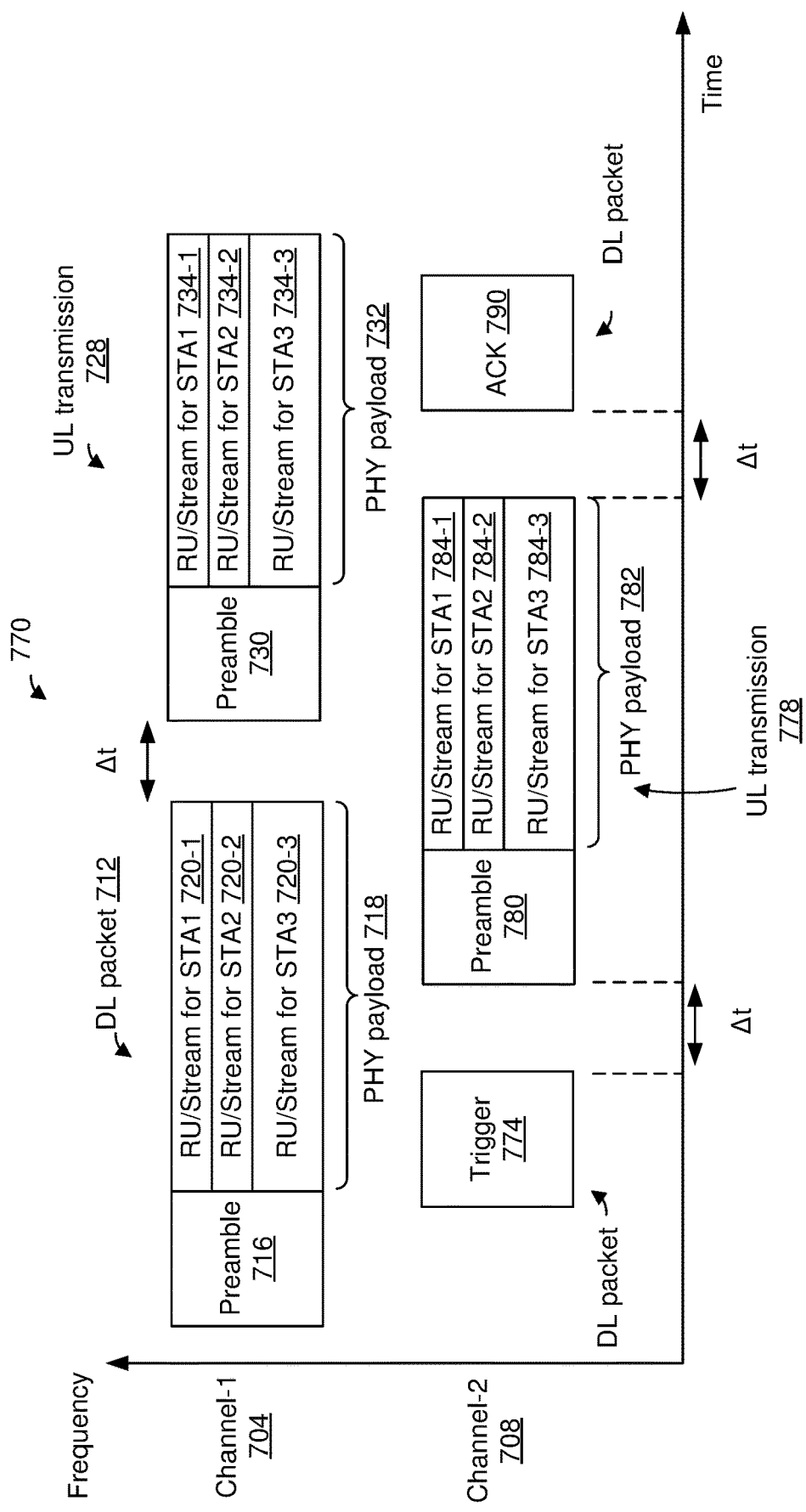
FIG. 7C is a diagram of another example packet exchange in a multi-band communication system, according to another embodiment.

FIG. 7C is a diagram of another example packet exchange 770 in a multi-band communication system, according to an embodiment. The packet exchange 770 is performed by communication devices of FIG. 1, according to an embodiment, and FIG. 7C is described with reference to FIG. 1 for ease of explanation. However, the packet exchange 770 illustrated in FIG. 7C is implemented by other suitable communication devices in other embodiments.

In some embodiments, the packet exchange 770 is in the context of the channelization schemes described above with respect to FIG. 3A or 3B. In other embodiments, the packet exchange 770 is in the context of other suitable channelization schemes.

The channelization scheme is the same as the channelization scheme described with reference to FIG. 7A.

In an embodiment corresponding to FIG. 7C, both the AP 114 and the plurality of client stations 154 are multi-band communication devices.

A portion of the packet exchange 770 is similar to the packet exchange 700 of FIG. 7A, and like-numbered elements are not described in detail for purposes of brevity.

Unlike the packet exchange 700 of FIG. 7A, the UL MU transmission 728 is transmitted in channel-1 704 responsive to the DL packet 712. For example, in an embodiment, the DL packet 712 includes one or more frames (such as an MU-BAR frame or another suitable trigger frame) configured to trigger the plurality of client stations 154 to transmit respective UL packets as part of the UL MU transmission 728 in channel-1 704.

In an embodiment, the trigger frame(s) in the DL packet 712 include RU allocation information that indicate frequency allocations and/or spatial stream allocations, in channel-1 704, to be used by the client stations 154 when participating in the UL MU transmission 728.

In an embodiment, the DL packet 712 indicates (e.g., the trigger frames indicate) to the one or more client stations 154 that the client stations 154 are to perform a CCA procedure prior to the client stations 154 beginning the UL MU transmission 728.

Concurrently with transmitting the DL packet 712 over channel-1 704, the AP 114 transmits (e.g., the network interface 122 transmits) a DL packet 774 to a plurality of the client stations 154 over channel-2 708. The DL packet 774 includes one or more trigger frames configured to trigger the plurality of client stations 154 to transmit respective UL packets as part of an UL MU transmission 778. In an embodiment, the trigger frame(s) in the DL packet 774 include RU allocation information that indicate frequency allocations and/or spatial stream allocations, in channel-2 708, to be used by the client stations 154 when participating in the UL MU transmission 778.

In an embodiment, the DL packet 774 indicates (e.g., the trigger frames indicate) to the one or more client stations 154 that the client stations 154 are to perform a CCA procedure prior to the client stations 154 beginning the UL MU transmission 778.

Following the DL transmission 774, after a time duration Δt, the client stations 154 begin transmitting as part of the UL MU transmission 778 in channel-2 708. In an embodiment, the time duration Δt is equal to a suitable time period (e.g., SIFS as defined by the IEEE 802.11 Standard or another suitable time period).

In an embodiment, the UL MU transmission 778 includes a PHY preamble portion 780 and a PHY payload portion 782. The PHY payload 782 includes respective data streams 784 transmitted by the respective client stations 154. In an embodiment, the respective data streams 784 are transmitted in respective allocated RUs as indicated in the trigger frames of the DL packet 774. In an embodiment, the respective data streams 784 include MAC frames (e.g., data frames, control frames, etc.) from the respective client stations 154.

In an embodiment, in response to the DL packet 774 indicating (e.g., the trigger frame(s) indicating) to the client stations 154 that the client stations 154 are to perform the CCA procedure prior to the client stations 154 beginning the UL transmission 778, each client station 154 use the CCA procedure to determining whether one or more sub-channels in which the client station 154 is to transmit are busy or idle.

In an embodiment in which channel-1 704 includes a primary sub-channel and channel-2 708 does not include a primary sub-channel (similar to the channelization illustrated in FIG. 3A), the CCA procedure performed by each client station 154 includes, prior to initiating the UL transmission 778, the client station 154 determines (e.g., the multi-band idle determination controller 184 determines) whether one or more of sub-channels in which the client station 154 is to transmit were idle during the time period Δt. In an embodiment, the client station 154 determines whether the secondary sub-channel(s) were idle during the time period Δt by performing the physical CS operation described above in each of the sub-channels. For example, the physical CS operation includes the multi-band idle determination controller 184 comparing energy levels in the sub-channels determined by the multi-band energy sensor 182 to one or more thresholds.

In response to the client station 154 determining (e.g., the multi-band idle determination controller 184 determining) that the one or more sub-channels were idle during the time period Δt, the client station 154 begins (e.g., the network interface device 162 begins) transmitting as part of the UL MU transmission 778. In an embodiment, the MAC processor 166 controls the network interface device 162 to transmit as part of the UL MU transmission 778.

In an embodiment, if any of the sub-channels in which the client station 154 is to transmit as part of the UL MU transmission 778 were not idle during the time period Δt, the client station 154 does not transmit (e.g., the network interface device 162 does not transmit) in such busy sub-channels.

In an embodiment, if none of the sub-channels in which the client station 154 is to transmit as part of the UL MU transmission 778 were idle during the time period Δt, the client station 154 does not participate in the UL MU transmission 778.

In an embodiment in which channel-1 704 includes a first primary sub-channel and channel-2 708 includes a second primary sub-channel (similar to the channelization illustrated in FIG. 3B), the CCA procedure performed by each client station 154 includes, prior to initiating the UL transmission 778, the network interface device 162 performs (e.g., the multi-band idle determination controller 184 performs) a virtual CS operation to determine whether channel-2 708 is idle. For example, the network interface device 162 determines (e.g., the multi-band idle determination controller 184 determines) whether a NAV counter corresponding to the second primary sub-channel indicates the channel-2 708 is idle.

In an embodiment, if the virtual CS operation indicates that channel-2 708 is busy, the client station 154 does not participate in the UL MU transmission 778.

On the other hand, if the virtual CS operation indicates that channel-2 708 is idle, the network interface device 162 determines (e.g., the multi-band idle determination controller 184 determines) whether one or more secondary sub-channels in channel-2 708 in which the client station 154 is to transmit were idle during the time period Δt. In an embodiment, the client station 154 determines whether the secondary sub-channel(s) were idle during the time period Δt by performing the physical CS operation described above in each of the sub-channels. For example, the physical CS operation includes the multi-band idle determination controller 184 comparing energy levels in the sub-channels determined by the multi-band energy sensor 182 to one or more thresholds.

In response to the client station 154 determining (e.g., the multi-band idle determination controller 184 determining) that the one or more secondary sub-channels were idle during the time period Δt, the client station 154 begins (e.g., the network interface device 162 begins) transmitting as part of the UL MU transmission 778. In an embodiment, the MAC processor 166 controls the network interface device 162 to transmit as part of the UL MU transmission 778.

In an embodiment, if any of the secondary sub-channels in which the client station 154 is to transmit as part of the UL MU transmission 778 were not idle during the time period Δt, the client station 154 does not transmit (e.g., the network interface device 162 does not transmit) in such busy secondary sub-channels.

In an embodiment, if none of the sub-channels in which the client station 154 is to transmit as part of the UL MU transmission 778 were idle during the time period Δt, the client station 154 does not participate in the UL MU transmission 778.

In an embodiment, the AP 114 transmits (e.g., the network interface 122 transmits) a DL packet 790 responsive to the UL transmission 778. The DL packet 790 includes acknowledgment information (e.g., a BA frames, an ACK frame, etc.) corresponding to the data streams 784 in the UL transmission 778. In an embodiment, the AP 114 transmits (e.g., the network interface 122 transmits) the DL packet 790 after a time duration Δt following an end of the UL transmission 778. In an embodiment, the time duration Δt is equal to a suitable time period (e.g., SIFS as defined by the IEEE 802.11 Standard or another suitable time period).

Figure 8A:
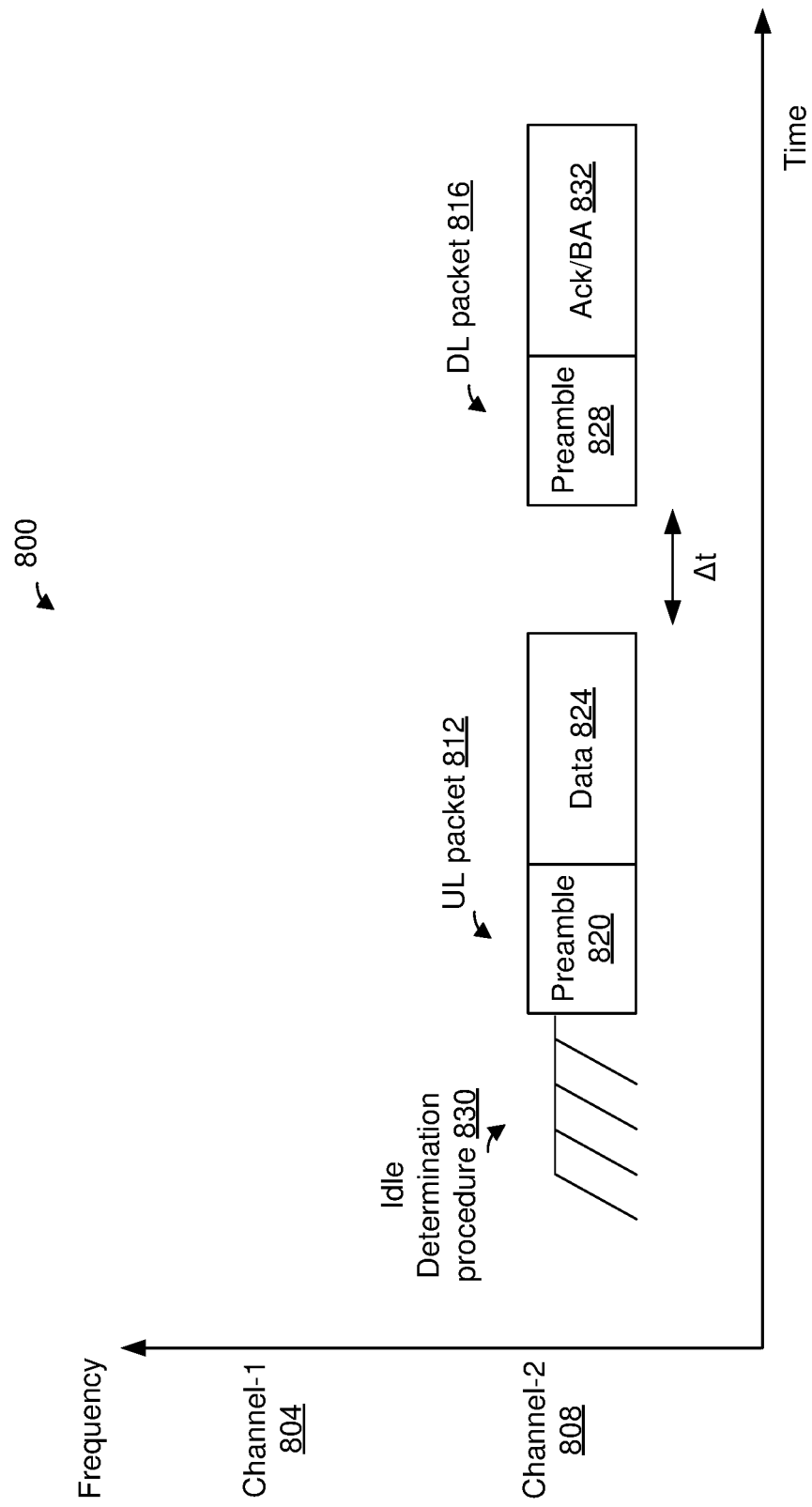
FIG. 8A is a diagram of another example packet exchange in a multi-band communication system, according to another embodiment.

FIG. 8A is a diagram of another example packet exchange 800 in a multi-band communication system, according to an embodiment. The packet exchange 800 is performed by communication devices of FIG. 1, according to an embodiment, and FIG. 7A is described with reference to FIG. 1 for ease of explanation. However, the packet exchange 800 illustrated in FIG. 8A is implemented by other suitable communication devices in other embodiments.

In some embodiments, the packet exchange 800 is in the context of the channelization schemes described above with respect to FIG. 3A or 3B. In other embodiments, the packet exchange 800 is in the context of other suitable channelization schemes.

The channelization scheme corresponding to the packet exchange 800 includes a first communication channel 804 (also referred to herein as "channel-1 804") aggregated with a second communication channel 808 (also referred to herein as "channel-2 808"). Channel-1 804 includes one or more component channels, and channel-2 808 includes one or more component channels. In an embodiment, channel-1 804 and channel-2 808 are within different RF bands. In another embodiment, channel-1 804 and channel-2 808 are within a same RF band. In some embodiments, channel-1 804 and channel-2 808 are adjacent in frequency (e.g., no gap in frequency exists between channel-1 804 and channel-2 808). In other embodiments, a relatively small gap in frequency exists between channel-1 804 and channel-2 808 with respect to the bandwidth of each component channel (e.g., if each component channel has a bandwidth of 20 MHz, the gap is less than 5 MHz, less than 2 MHz, less than 1 MHz, etc.). In other embodiments, a relatively large gap in frequency exists between channel-1 804 and channel-2 808 with respect to the bandwidth of each component channel (e.g., if each component channel has a bandwidth of 20 MHz, the gap is at least 20 MHz, at least 40 MHz, at least 100 MHz, at least 1 GHz, etc.).

The client station 154 transmits (e.g., the network interface 162 transmits) an unscheduled UL packet 812 to the AP 114 over channel-2 808. The UL packet 812 includes a PHY preamble 820 and a PHY payload 824.

Prior to transmitting the UL packet 812, the client station 154 begins (e.g., the network interface 162 begins, the MAC processor 166 performs, the multi-band idle determination controller 184 performs) a procedure 830 to determine if channel-2 808 is idle.

In an embodiment in which channel-1 804 includes a primary sub-channel and channel-2 808 does not include a primary channel, the procedure 830 includes beginning a backoff procedure (such as described above) when the client station 154 determines (e.g., the network interface 162 determines, the MAC processor 166 determines, the multi-band idle determination controller 184 determines) that the primary sub-channel of channel-1 804 is idle (e.g., using the CCA procedure described above), according to an embodiment. For example, the communication device begins (e.g., the multi-band idle determination controller 184 begins) the backoff procedure after a packet transmission by another device ends or a previous TXOP ends and the CCA procedure described above indicates that the primary sub-channel in channel-1 804 is idle.

Prior to initiating transmission of the UL packet 812, and in connection with the backoff procedure, the communication device determines (e.g., the multi-band idle determination controller 184 determines) whether the one or more of the secondary sub-channels in channel-2 808 were idle during a time period Δt immediately prior to beginning transmission of the UL packet 812. In an embodiment, the communication device determines whether the secondary sub-channels were idle during the time period Δt by performing the physical CS operation described above in each of the secondary sub-channels. For example, the physical CS operation includes the multi-band idle determination controller 184 comparing energy levels in the secondary sub-channels determined by the multi-band energy sensor 182 to one or more thresholds.

In an embodiment, the time duration Δt is equal to an interframe space (such as PIFS as defined in the IEEE 802.11 Standard). In other embodiments, the time duration Δt is another suitable time period (such as SIFS as defined in the IEEE 802.11 Standard, or another suitable time period).

In response to the backoff counter reaching zero and the communication device determining that the secondary sub-channels were idle during the time period Δt, the communication device begins transmitting the UL packet 812.

In an embodiment, if any of the secondary sub-channels were not idle during the time period Δt, such busy secondary sub-channels 412 are not used in transmitting the UL packet 812.

In another embodiment in which channel-1 804 includes a first primary sub-channel and channel-2 808 includes a second primary channel, the procedure 830 includes beginning a backoff procedure (such as described above) when the client station 154 determines (e.g., the network interface 162 determines, the MAC processor 166 determines, the multi-band idle determination controller 184 determines) that the second primary sub-channel of channel-2 808 is idle (e.g., using the CCA procedure described above), according to an embodiment. For example, the communication device begins (e.g., the multi-band idle determination controller 184 begins) the backoff procedure after a packet transmission by another device ends or a previous TXOP ends and the CCA procedure described above indicates that the second primary sub-channel in channel-2 808 is idle.

Prior to initiating transmission of the UL packet 812, and in connection with the backoff procedure, the communication device determines (e.g., the multi-band idle determination controller 184 determines) whether the one or more of the sub-channels in channel-2 808 were idle during a time period Δt immediately prior to beginning transmission of the UL packet 812. In an embodiment, the communication device determines whether the sub-channels were idle during the time period Δt by performing the physical CS operation described above in each of the sub-channels. For example, the physical CS operation includes the multi-band idle determination controller 184 comparing energy levels in the sub-channels determined by the multi-band energy sensor 182 to one or more thresholds.

In an embodiment, the time duration Δt is equal to an interframe space (such as PIFS as defined in the IEEE 802.11 Standard). In other embodiments, the time duration Δt is another suitable time period (such as SIFS as defined in the IEEE 802.11 Standard, or another suitable time period).

In response to the backoff counter reaching zero and the communication device determining that the sub-channels were idle during the time period Δt, the communication device begins transmitting the UL packet 812.

In an embodiment, if the second primary sub-channel was not idle during the time period Δt, the UL packet 812 is not transmitted. In an embodiment, if any secondary sub-channels were not idle during the time period Δt, such busy secondary sub-channels 412 are not used in transmitting the UL packet 812.

In another embodiment, the AP 114 starts the DL transmission 816 in band 1 804 after performing a backoff procedure, where the backoff procedure overlaps with the UL transmission 812 in the time domain. In an embodiment, the backoff procedure is similar to the backoff procedure 420 or the backoff procedure 464 discussed with reference to FIGS. 4A-D.

Figure 8B:
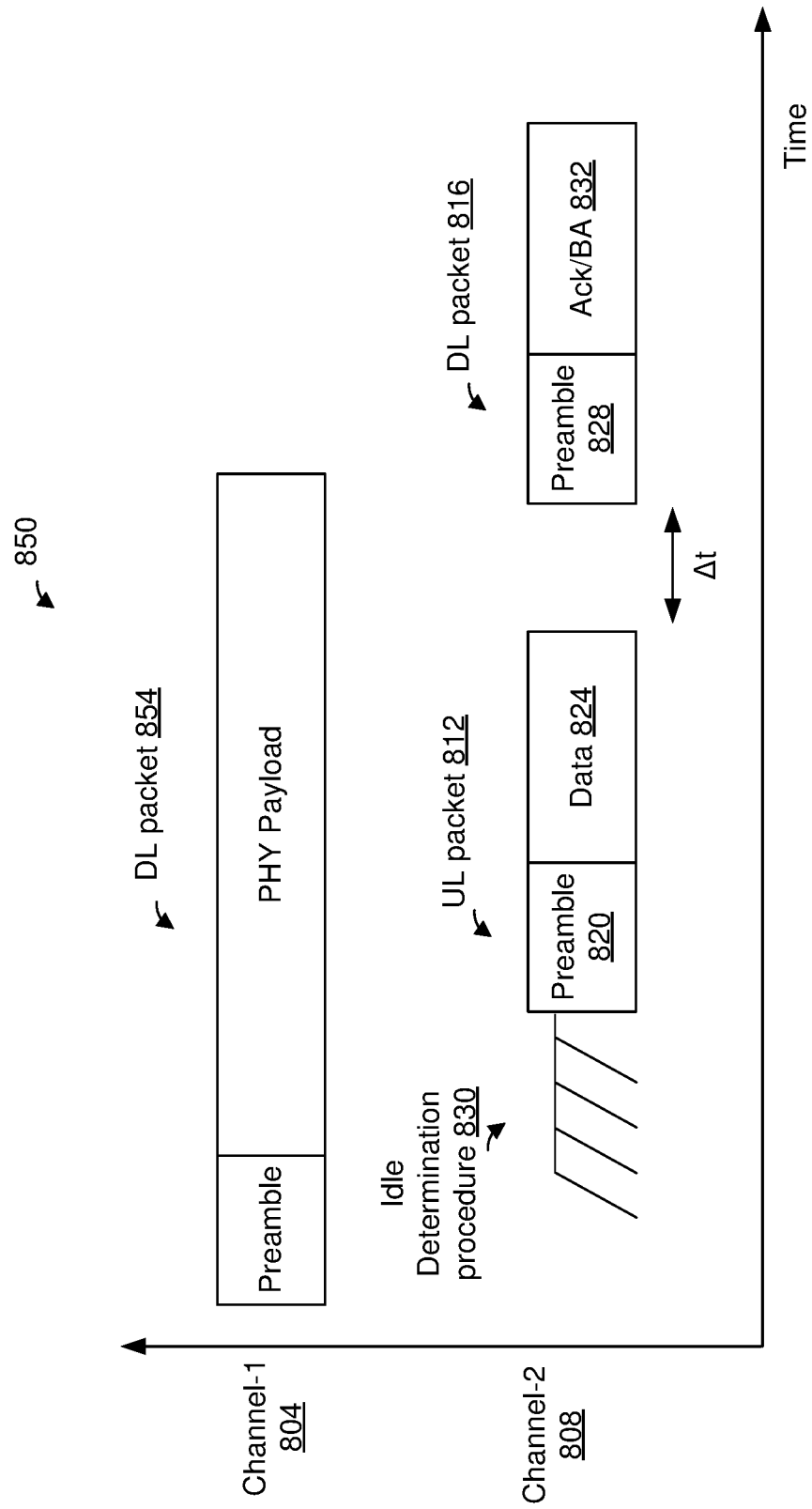
FIG. 8B is a diagram of another example packet exchange in a multi-band communication system, according to another embodiment.

FIG. 8B is a diagram of another example packet exchange 850 in a multi-band communication system, according to another embodiment. The packet exchange 850 is performed by communication devices of FIG. 1, according to an embodiment, and FIG. 7B is described with reference to FIG. 1 for ease of explanation. However, the packet exchange 850 illustrated in FIG. 8B is implemented by other suitable communication devices in other embodiments.

The packet exchange 850 is similar to the packet exchange 800 of FIG. 8A, but the UL transmission 812 in channel-2 808 is concurrent with a DL transmission in channel-1 804.

For example, in another embodiment in which channel-1 804 includes a first primary sub-channel and channel-2 808 includes a second primary channel, the client station 154 performs (e.g., the network interface 162 performs, the MAC processor 166 performs, the multi-band idle determination controller 184 performs) the procedure 830 concurrent with the DL transmission 854, including beginning a backoff procedure (such as described above) when the client station 154 determines (e.g., the network interface 162 determines, the MAC processor 166 determines, the multi-band idle determination controller 184 determines) that the second primary sub-channel of channel-2 808 is idle (e.g., using the CCA procedure described above). For example, the communication device begins (e.g., the multi-band idle determination controller 184 begins) the backoff procedure after a packet transmission in channel-2 808 by another device ends or a previous TXOP in channel-2 808 ends and the CCA procedure described above indicates that the second primary sub-channel in channel-2 808 is idle.

Figure 9:
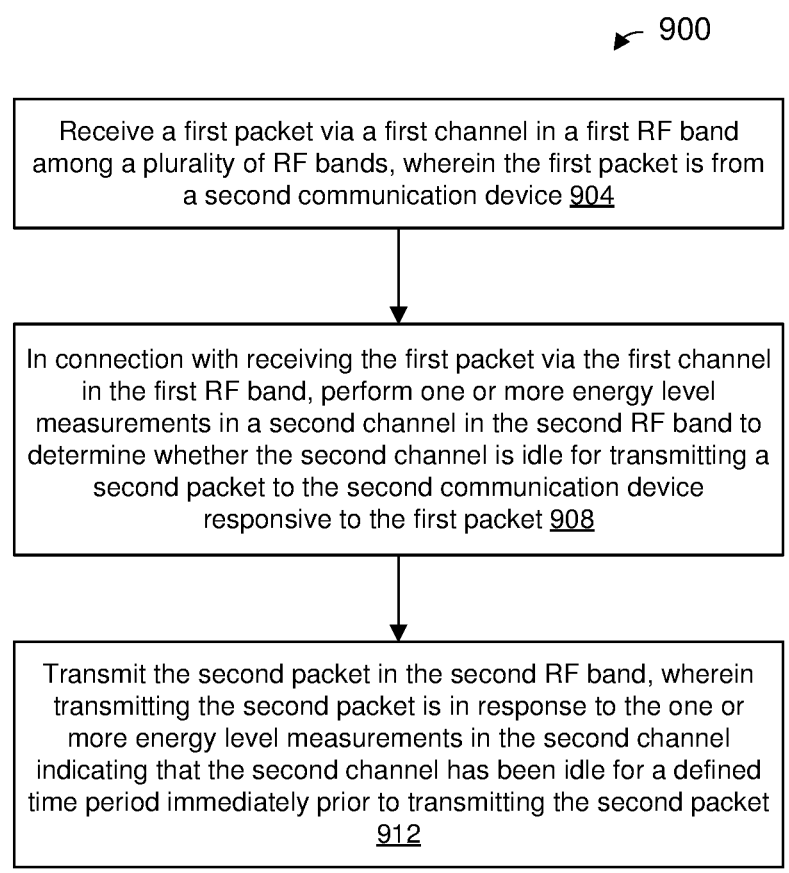
FIG. 9 is a flow diagram of an example method for reception and transmission of signals in a multi-channel communication system, according to an embodiment.

FIG. 9 is a flow diagram of an example method 900 for reception and transmission of signals in a multi-channel communication system, according to an embodiment. In some embodiments, the client station 154 of FIG. 1 is configured to implement the method 900. The method 900 is described, however, in the context of the client station 154 merely for explanatory purposes and, in other embodiments, the method 900 is implemented by another suitable device such as the AP 114 or another suitable communication device.

In some embodiments, the method 900 is utilized in the context of multi-RF band channelizations such as described above in reference to FIGS. 3A-B. In other embodiments, the method 900 is utilized in the context of other suitable multi-RF band channelizations, such as channelizations employing three or more RF bands. In other embodiments, the method 900 is utilized in the context of multiple channels within a same RF band.

FIG. 9 is described with reference to FIGS. 6B, 7A, 7B, and 7C for ease of explanation. However, the method 900 is not limited to the specific examples described with reference to FIGS. 6B, 7A, 7B, and 7C. For example, the method 900 is utilized in the context of other suitable packet exchanges and/or multi-RF band channelizations different than the packet exchanges and multi-RF band channelizations of FIGS. 6B, 7A, 7B, and 7C.

At block 904, a first communication device receives (e.g., the client station 154 receives) a first packet via a first channel in a first RF band among a plurality of RF bands. In an embodiment, the first packet is from a second communication device (e.g., the AP 114). In an embodiment, the first channel is part of an aggregate communication channel that also includes a second channel in a second RF band among the plurality of RF bands. In other embodiments in which the method 900 is implemented in the context of a plurality of channels within a same RF band, the first channel and the second channel are both within the same RF band.

At block 908, in connection with receiving the first packet via the first channel in the first RF band, the first communication device determines (e.g., the client station 154 performs, the MAC processor 166 determines, the multi-band idle determination controller 184 determines, etc.) whether the second channel is idle for transmitting a second packet to the second communication device responsive to the first packet. In an embodiment in which the second channel in the second RF band comprises one or more sub-channels, determining whether the second channel is idle includes the first communication device determining (e.g., the network interface device 162 determining, the MAC processor 166 determining, the multi-band idle determination controller 144 determining, etc.) whether the second channel is idle based on energy level measurement(s) made (e.g., made by the multi-band energy sensor 182) in the one or more sub-channels. For example, the first communication device performs (e.g., the network interface device 162 performs, the MAC processor 166 performs, the multi-band idle determination controller 144 performs, etc.) a physical CS operation such as described above based on energy level measurement(s) made (e.g., made by the multi-band energy sensor 142) in the one or more sub-channels. In an embodiment, physical CS operation includes determining whether each sub-channel within the second channel has been idle for a defined time period immediately prior to transmitting a second packet.

In an embodiment, the method 900 further comprises the first communication device maintaining (e.g., the network interface device 162 maintaining, the MAC processor 166 maintaining, the multi-band idle determination controller 184 maintaining): a first counter that indicates whether the first channel in the first RF band is currently reserved, and a second counter that indicates whether the second channel in the second RF band is currently reserved. For example, the first counter is a first NAV counter associated with a first primary sub-channel in the first channel, and the second counter is a second NAV counter associated with a second primary sub-channel in the first channel. In embodiments in which the communication device maintains a first counter that indicates whether the first channel in the first RF band is currently reserved, and a second counter that indicates whether the second channel in the second RF band is currently reserved: determining whether the second channel is idle is further based on performing a virtual CS operation using the second counter, e.g., determining whether the second channel is idle is further based on the second counter.

At block 912, in response to determining that the second channel is idle, the first communication device transmits (e.g., the network interface device 162 transmits) the second packet in the second channel. In an embodiment transmitting the second packet in the second channel is responsive to carrier sensing in the second channel indicating that the second channel has been idle for the defined time period immediately prior to transmitting the second packet.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for wireless local area network (WLAN) medium access control in a plurality of radio frequency (RF) bands, the method comprising:
   performing, at a communication device, a backoff procedure to determine when a first channel in a first RF band is idle,
   wherein the backoff procedure includes decrementing a backoff counter only when at least a portion of the first channel is determined to be idle,
   defining a composite WLAN communication channel for a frame transmission as including a first frequency portion in the first channel of the first RF band and a second frequency portion in a second channel of a second RF band;
   in response to determining that the first channel in the first RF band is idle,
      transmitting, by the communication device, a first packet that reserves the first channel in the first RF band for a first particular time duration in connection with reserving the composite communication channel; and
      performing, at the communication device, one or more energy level measurements in the second channel in the second RF band to determine whether the second channel is idle; and transmitting, by the communication device, a second packet that reserves the second channel in the second RF band for a second particular time duration in connection with reserving the composite communication channel, wherein transmitting the second packet is in response to the one or more energy level measurements in the second channel indicating that the second channel has been idle for a defined time period immediately prior to transmitting the second packet.

2. The method of claim 1,
wherein some WLAN legacy devices are configured to operate in the second RF band and cannot operate in the first RF band.

3. The method of claim 1,
wherein the first RF band is spaced apart from the second RF band by at least 1 GHz.

4. The method of claim 1, further comprising:
maintaining, at the communication device, a first counter that indicates whether the first channel in the first RF band is currently reserved; and
maintaining, at the communication device, a second counter that indicates whether the second channel in the second RF band is currently reserved;
wherein transmitting the first packet is further in response to determining, using the first counter, that the first channel in the first RF band is not currently reserved; and
wherein transmitting the second packet is further in response to determining, using the second counter, that the second channel in the second RF band is not currently reserved.

5. The method of claim 1, wherein:
the first packet is transmitted at a first time; and
the second packet is transmitted at a second time different than the first time.

6. The method of claim 1, wherein the first particular time duration is different that the second particular time duration.

7. The method of claim 1, further comprising:
defining the composite WLAN channel as including the first channel in the first RF band and the second channel in the second RF band;
wherein the first RF band and the second RF band are two different RF bands.

8. A communication device for operating in a plurality of radio frequency (RF) bands, the communication device comprising:
a network interface device having one or more integrated circuit (IC) devices;
a backoff counter implemented on the one or more IC devices; and
one or more energy level sensors implemented on the one or more IC devices;
wherein the one or more IC devices are configured to:
perform, using the back off counter, a backoff procedure to determine when a first channel in a first RF band, among the plurality of RF bands, is idle,
wherein the backoff procedure includes decrementing the backoff counter only when at least a portion of the first channel is determined to be idle,
define a composite WLAN communication channel for a frame transmission as including a first frequency portion in the first channel of the first RF band and a second frequency portion in a second channel of a second RF band,
in response to determining that the first channel in the first RF band is idle,
transmit a first packet that reserves the first channel in the first RF band for a first particular time duration in connection with reserving the composite communication channel, and
perform, using the one or more energy level sensors, one or more energy level measurements in the second channel in the second RF band to determine whether the second channel is idle, and
transmit a second packet that reserves at least the second channel in the second RF band for a second particular time duration in connection with reserving the composite communication channel,
wherein transmitting the second packet is in response to carrier sensing in the second channel indicates that the second channel has been idle for a defined time period immediately prior to transmitting the second packet.

9. The communication device of claim 8,
wherein some WLAN legacy devices are configured to operate in the second RF band and cannot operate in the first RF band.

10. The communication device of claim 8,
wherein the first RF band is spaced apart from the second RF band by at least 1 GHz.

11. The communication device of claim 8, further comprising:
a first counter implemented on the one or more IC devices,
wherein the first counter is configured to indicate whether the first channel in the first RF band is currently reserved; and
a second counter implemented on the one or more IC devices,
wherein the second counter is configured to indicate whether the second channel in the second RF band is currently reserved;
wherein the one or more IC devices are further configured to:
transmit the first packet further in response to determining, using the first counter, that the first channel in the first RF band is not currently reserved, and
transmit the second packet further in response to determining, using the second counter, that the second channel in the second RF band is not currently reserved.

12. The communication device of claim 8, wherein:
the first packet is transmitted at a first time; and
the second packet is transmitted at a second time different than the first time.

13. The communication device of claim 8,
wherein the first particular time duration is different that the second particular time duration.

14. The method of claim 8:
defining the composite WLAN channel as including the first channel in the first RF band and the second channel in the second RF band;
wherein the first RF band and the second RF band are two different RF bands.

15. A method for wireless local area network (WLAN) communications in a plurality of radio frequency (RF) bands, the method comprising:
receiving, at a first communication device, a first packet via a first channel in a first RF band among the plurality of RF bands,
wherein each RF band in the plurality of RF bands does not overlap in frequency with any other RF band in the plurality of RF bands, wherein the first packet is from a second communication device;

in connection with receiving the first packet via the first channel in the first RF band, performing, at the first communication device, one or more energy level measurements in a second channel in the second RF band to determine whether the second channel is idle for transmitting a second packet to the second communication device responsive to the first packet; and transmitting, by the first communication device, the second packet in the second RF band, wherein transmitting the second packet is in response to the one or more energy level measurements in the second channel indicating that the second channel has been idle for a defined time period immediately prior to transmitting the second packet.

16. The method of claim 15, further comprising:

maintaining, at the communication device, a first counter that indicates whether the first channel in the first RF band is currently reserved; and maintaining, at the communication device, a second counter that indicates whether the second channel in the second RF band is currently reserved;

wherein transmitting the second packet is further in response to determining, using the second counter, that the second channel in the second RF band is not currently reserved.

17. A communication device for operating in a plurality of radio frequency (RF) bands, the communication device comprising:

a network interface device having one or more integrated circuit (IC) devices; and one or more energy level sensors implemented on the one or more IC devices;

wherein the one or more IC devices are configured to:

receive a first packet via a first channel in a first RF band among the plurality of RF bands, wherein each RF band in the plurality of RF bands does not overlap in frequency with any other RF band in the plurality of RF bands, wherein the first packet is from another communication device, in connection with receiving the first packet via the first channel in the first RF band, perform, using the one or more energy level sensors, one or more energy level measurements in a second channel in the second RF band to determine whether the second channel is idle for transmitting a second packet to the another communication device responsive to the first packet, and transmit the second packet in the second RF band, wherein transmitting the second packet is in response to the one or more energy level measurements in the second channel indicating that the second channel has been idle for a defined time period immediately prior to transmitting the second packet.

18. The communication device of claim 17, further comprising:

a first counter implemented on the one or more IC devices, wherein the first counter is configured to indicate whether the first channel in the first RF band is currently reserved; and a second counter implemented on the one or more IC devices, wherein the second counter is configured to indicate whether the second channel in the second RF band is currently reserved;

wherein the one or more IC devices are further configured to:

transmit the second packet further in response to determining, using the second counter, that the second channel in the second RF band is not currently reserved.

* * * * *